United States Patent [19]

Asuma et al.

[11] Patent Number: 5,592,605
[45] Date of Patent: Jan. 7, 1997

[54] MENU PICTURE DISPLAY METHOD AND APPARATUS FOR A DATA PROCESSOR

[75] Inventors: Hajime Asuma, Chigasaki; Tsukasa Hasegawa, Hiratsuka; Akira Naito; Yasuhiko Kasai, both of Fujisawa; Tomoko Tsuchiya, Tokyo; Shinichi Yoshida, Yokohama; Yasumasa Matsuda, Tokyo, all of Japan

[73] Assignee: Hitachi, Ltd., Japan

[21] Appl. No.: 285,036

[22] Filed: Aug. 2, 1994

[30] Foreign Application Priority Data

Aug. 5, 1993 [JP] Japan .................................. 5-194469
Jan. 19, 1994 [JP] Japan .................................. 6-004118

[51] Int. Cl.⁶ .................................................. G06F 3/14
[52] U.S. Cl. ............................................ 395/348; 395/320
[58] Field of Search ................................. 395/155, 159, 395/156, 157, 158, 161, 120, 600

[56] References Cited

U.S. PATENT DOCUMENTS 4,868,766  9/1989  Oosterholt ............................ 395/120
5,040,131  8/1991  Torres .................................... 395/156
5,062,060  10/1991 Kolnick ................................. 395/159
5,317,732  5/1994  Gerlach, Jr. et al. ................. 395/600
5,339,392  8/1994  Risberg et al. ....................... 395/161

FOREIGN PATENT DOCUMENTS 5-28157   3/1990  Japan .
3-222033  11/1991 Japan .

*Primary Examiner*—Mark R. Powell
*Assistant Examiner*—Ruay Lian Ho
*Attorney, Agent, or Firm*—Evenson, McKeown, Edwards & Lenahan P.L.L.C.

[57] ABSTRACT

The icon menu display method and apparatus according to the invention displays a perspective view of a work room over an entire screen as a background against which a plurality of icons are displayed. The icons are arranged against the background image at locations which are functionally related to the functions associated with each icon.

28 Claims, 26 Drawing Sheets

FIG. 2(a)

| MENU NO. | MENU NAME | MENU FORMAT | BACKGROUND IMAGE DATA POINTER | MENU NO. OF NEXT LAYER | ICON NO. | DISPLAY POSITION |
|---|---|---|---|---|---|---|
| 1 | DESK MENU | WHOLE SCREEN | $BI_1$ | 2 | 1 | $(DX_0, DY_0)$ |
| | | | | | 2 | $(DX_1, DY_1)$ |
| | | | | | ⋮ | ⋮ |
| | | | | | 8 | $(DX_8, DY_8)$ |
| 2 | TOOL BOX MENU | POP UP | $BI_2$ | Null | 9 | $(DX_9, DY_9)$ |
| | | | | | ⋮ | ⋮ |
| | | | | | 15 | $(DX_{15}, DY_{15})$ |

FIG. 2(b)

| ICON NO. | FUNCTION NAME | PATTERN DATA POINTER | APPLICATION PROGRAM POINTER |
|---|---|---|---|
| 0 | TOOL BOX | $I_0$ | Null |
| 1 | NEW DOCUMENT | $I_1$ | $F_1$ |
| 2 | UPDATE · PRINT | $I_2$ | $F_2$ |
| ⋮ | ⋮ | ⋮ | ⋮ |
| 8 | LABEL PRINTING | $I_8$ | $F_8$ |
| 9 | ENLARGED CHARACTER PRINTING | $I_9$ | $F_9$ |
| ⋮ | ⋮ | ⋮ | ⋮ |
| 15 | ANOTHER SYSTEM | $I_{15}$ | $F_{15}$ |

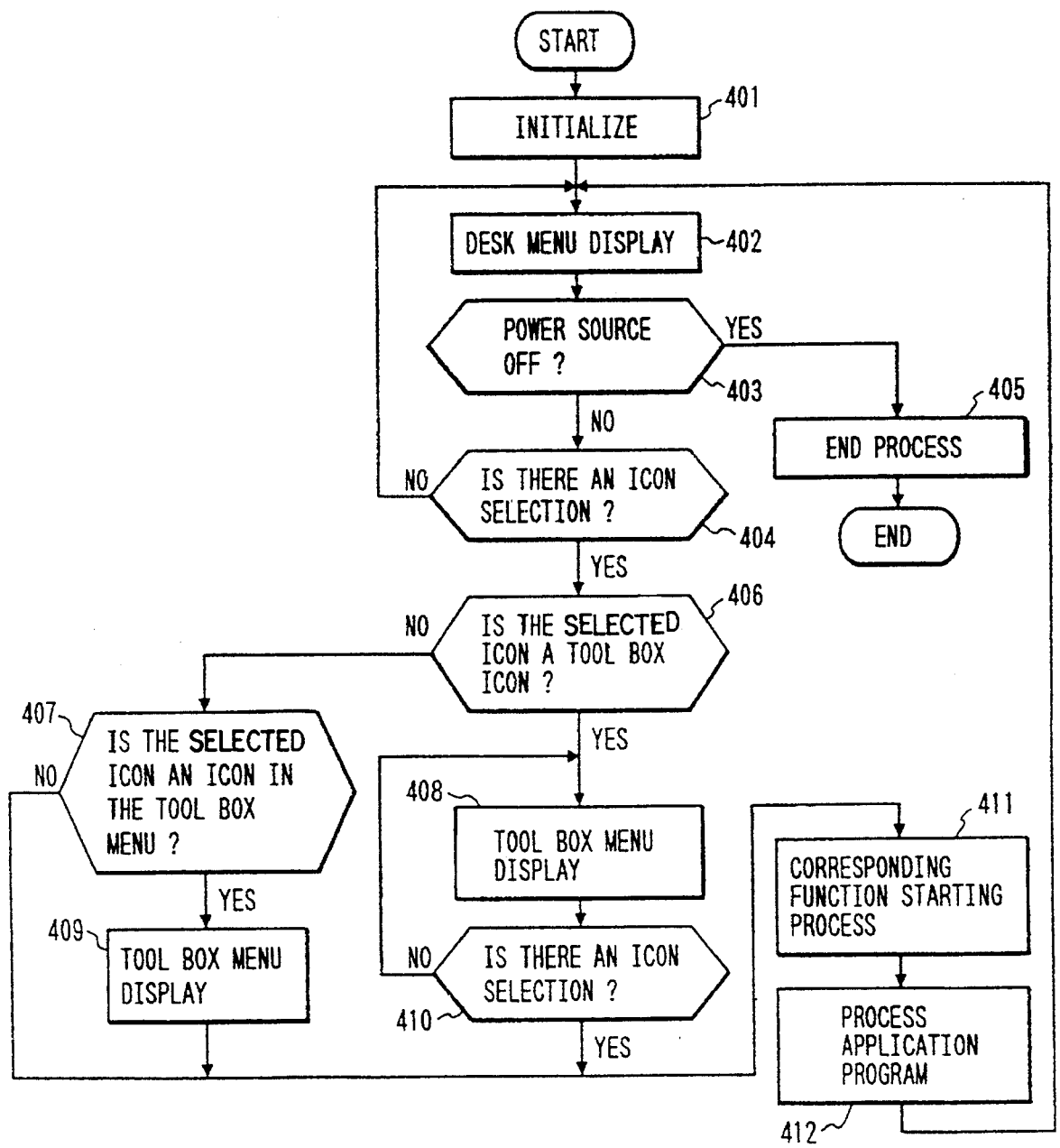

FIG. 6(a)

| MENU NO. 602 | MENU NAME 603 | MENU FORMAT 604 | BACKGROUND IMAGE DATA POINTER 605 | MENU NO. OF NEXT LAYER 606 | ICON NO. 607 | DISPLAY POSITION 608 |
|---|---|---|---|---|---|---|
| 1 | DESK MENU | WHOLE SCREEN | $BI_1$ | 2 | 0 | $(DX_0, DY_0)$ |
|   |   |   |   |   | 1 | $(DX_1, DY_1)$ |
|   |   |   |   |   | ... | ... |
|   |   |   |   |   | 8 | $(DX_8, DY_8)$ |
| 2 | TOOL BOX MENU | POP UP | $BI_2$ | Null | 9 | $(DX_9, DY_9)$ |
|   |   |   |   |   | ... | ... |
|   |   |   |   |   | 15 | $(DX_{15}, DY_{15})$ |
| 3 | MATRIX MENU | WHOLE SCREEN | $BI_3$ | Null | 1 | $(MX_1, MY_1)$ |
|   |   |   |   |   | ... | ... |
|   |   |   |   |   | 15 | $(MX_{15}, MY_{15})$ |

| ICON NO. 613 | FUNCTION NAME 614 | PATTERN DATA POINTER 615 | PATTERN DATA POINTER 616 | APPLICATION PROGRAM POINTER 617 |
|---|---|---|---|---|
| 0 | TOOL BOX | $DI_0$ | Null | Null |
| 1 | NEW DOCUMENT | $DI_1$ | $I_1$ | $F_1$ |
| 2 | UPDATE · PRINT | $DI_2$ | $I_2$ | $F_2$ |
| ... | ... | ... | ... | ... |
| 8 | LABEL PRINTING | $DI_8$ | $I_8$ | $F_8$ |
| 9 | ENLARGED CHARACTER PRINTING | $I_9$ | $I_9$ | $F_9$ |
| ... | ... | ... | ... | ... |
| 15 | ANOTHER SYSTEM | $I_{15}$ | $I_{15}$ | $F_{15}$ |

(612, 618, 619, 620, 621, 622)

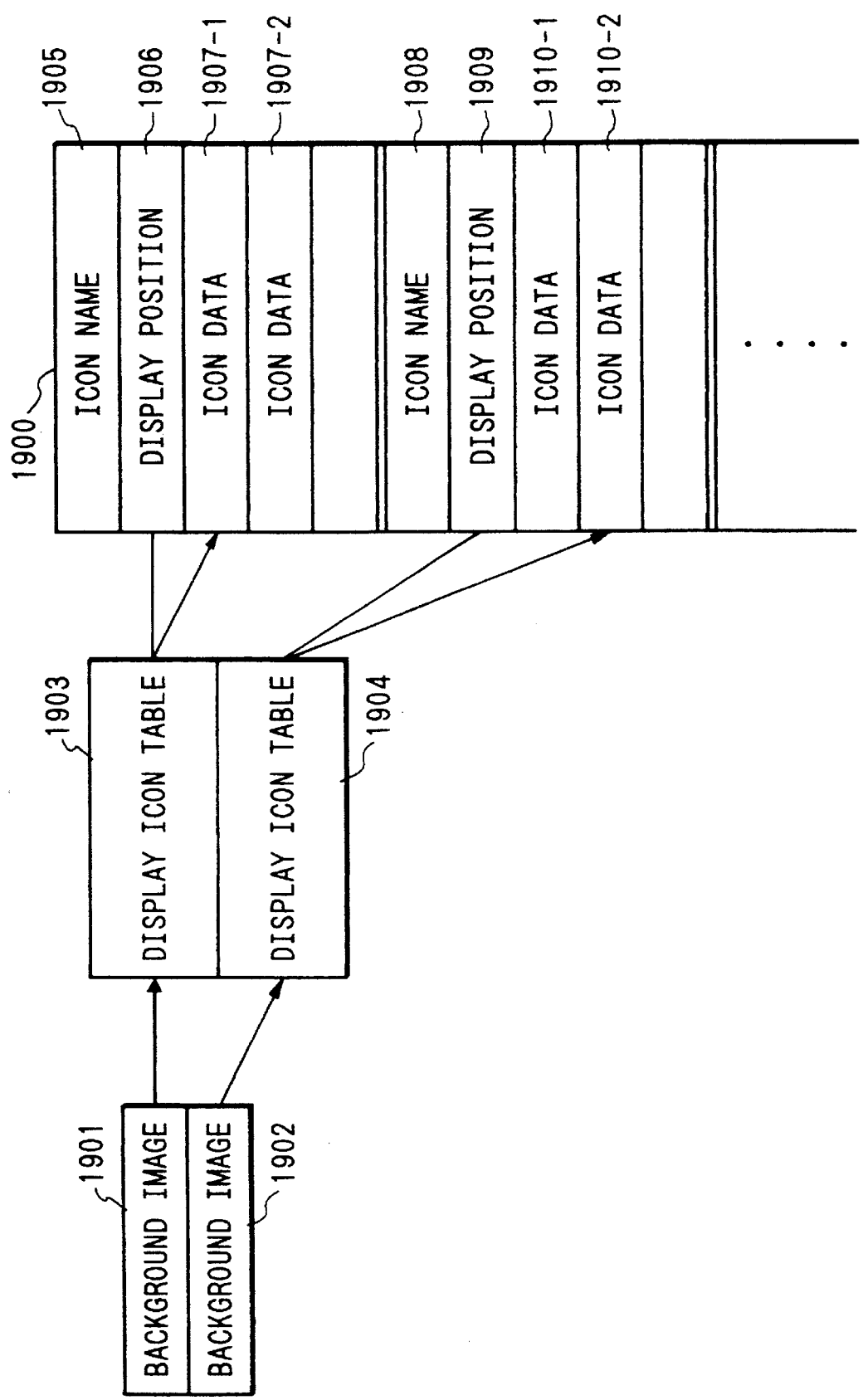

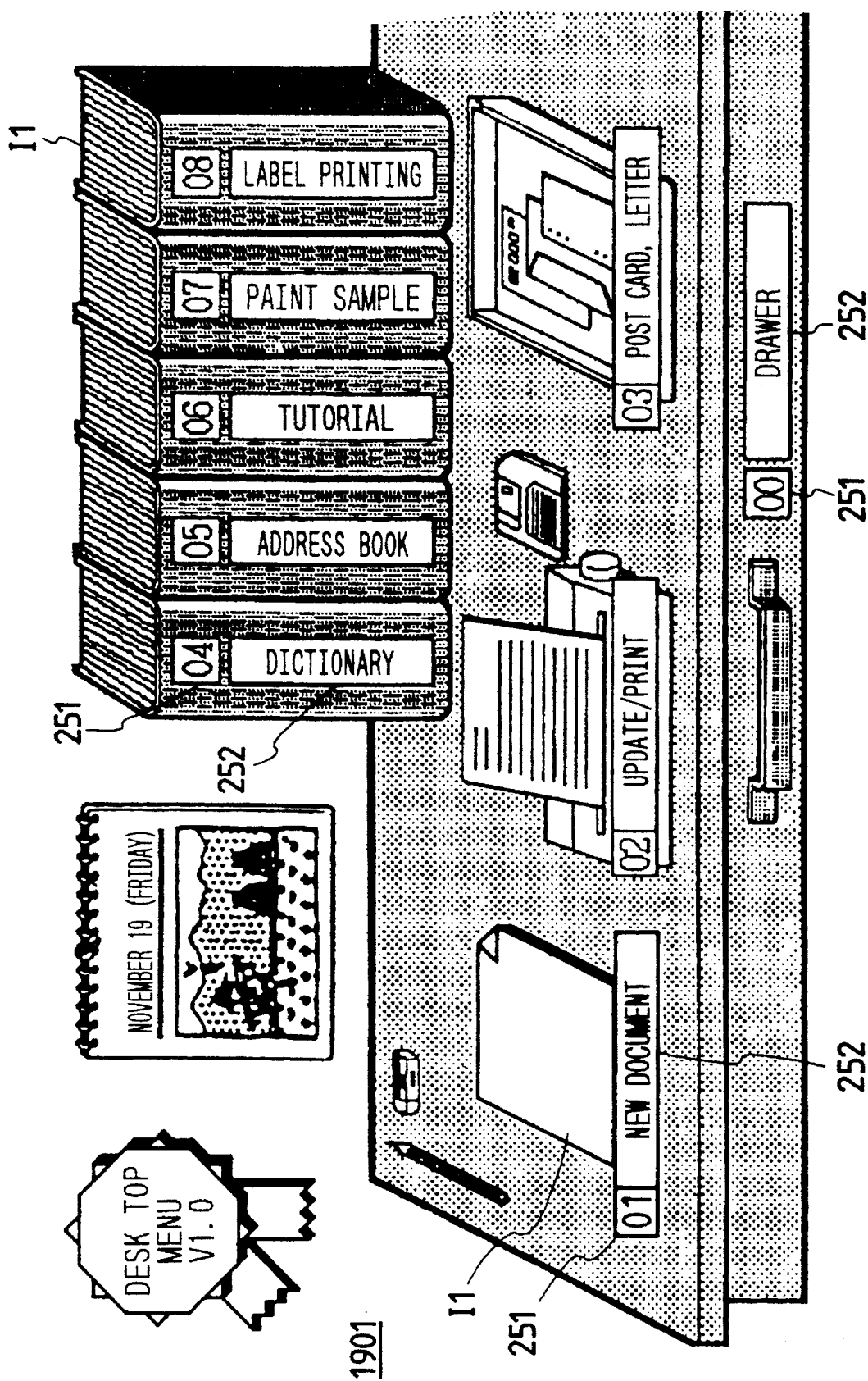

MENU PICTURE DISPLAY METHOD AND APPARATUS FOR A DATA PROCESSOR

BACKGROUND OF THE INVENTION

The present invention relates to an icon menu display apparatus having an icon menu for displaying a plurality of icons representing a variety of functions, a method of displaying the icon menu, and a method of operating the icon menu display apparatus.

A method of displaying an icon menu for indicating a plurality of icons representing a variety of functions such as an icon menu for a document preparation apparatus as disclosed in Japanese Non-examined Patent Publication No. 5-28157 is generally known in which a plurality of icons are arranged in a matrix of m rows and n columns. The m and n each represents a given integer. For example, the icon menu disclosed in the above-mentioned Patent Publication is composed of a matrix of 2 rows and 5 columns.

Japanese Non-examined Patent Publication No. 3-222033 discloses a method for accessing data by means of images. In this method, a first window is opened to display an image of a job site, the image including animated icons that can be opened and closed. Dragging one of the animated icons in the first window with a mouse automatically creates a second window in which a variety pieces of stored data are displayed.

An icon menu such as the above-mentioned icon menu of the document preparation apparatus disclosed in Japanese Non-examined Patent Publication No. 5-28157, in which the plurality of icons are displayed in a matrix, presents a particular problem. Namely, for a user to select a desired function of the apparatus via the plurality of displayed icons, it is necessary for him or her to determine an icon corresponding to the desired function only by the icon's pattern and/or accompanying text. If the user is an expert user, there is no problem in quickly identifying necessary icons because he or she is well versed in the relationships between the icons and the functions and an layout of the icons. However, for a novice user, it takes time for him or her to understand the relationships and it is difficult to grasp the layout, sometimes resulting in an icon selection error.

In the above-mentioned method of accessing data by means of images as disclosed in Japanese Non-examined Patent Publication No. 3-222033, animated icons such as drawers and doors are opened or closed, in windows, by dragging the mouse to retrieve a variety of pieces of data such as a personnel file or move to another application. This method, however, makes it difficult to distinguish individual icons that respond to a mouse operation from a background of the icons that do not respond to it. This method also makes it difficult for the user to know a function from a selected icon. Further, multiple windows make the icons relatively small, thereby making it difficult for the user to select individual icons with ease. Still further, in the above-mentioned method, the background image and the icons in the first windows are in a fixed relationship, so that the user cannot modify the relationship as he or she likes.

SUMMARY OF THE INVENTION

It is therefore an object of the present invention to provide an icon menu display apparatus, a method of displaying the icon menu, and a method of operating the icon menu display apparatus in which a perspective view of a workroom having a desk and walls for example is displayed over an entire screen as a background image and icons such as having shapes of books for example are laid out over the background image, thereby allowing a user to easily identify the relationship of icons to their corresponding functions and easily locate the individual icons on the screen.

It is another object of the present invention to provide an icon menu display apparatus, a method of displaying the icon menu, and a method of operating the icon menu display in which at least two modes are provided: in one mode, the icon menu is displayed; in the other mode, the icons are laid out in a matrix, thereby allowing a novice user as well as an expert user to easily use the apparatus.

It is still another object of the present invention to provide an icon menu display apparatus, a method of displaying the icon menu, and a method of operating the icon menu display apparatus in which a selected icon is stored in memory and a cursor is automatically positioned at the stored icon, thereby making it easy to select a icon repeatedly for repetitive operations of the same function.

It is yet another object of the present invention to provide an icon menu display method and a system therefor in which a user can select a background image and change the relationship between a icon symbolizing a selectable function and each background image to enlarge the degree of freedom for a unique way in which a user operates the apparatus, thereby enhancing ease of operation.

In carrying out the invention and according to one aspect thereof, there is provided an icon menu display apparatus comprising:

icon storage means for storing icon data composed of pattern data and function name data, the icon data defining a plurality of icons selectable by icon selecting means;

background image storage means for storing, as a background for an icon menu, a background image representing a perspective view of a workroom having a desk;

background image display means for displaying the above-mentioned background image over an entire screen;

display position storage means for storing display position data indicating, according to the above-mentioned pattern data, a plurality of positions in the above-mentioned background image in which the above-mentioned icons are positioned; and an icon display means for displaying the above-mentioned icons on the above-mentioned background image according to the above-mentioned display position.

In carrying out the invention and according to another aspect thereof, there is provided an icon menu display apparatus, wherein;

the above-mentioned icon storage means stores second icon data corresponding to each of a plurality of functions;

the above-mentioned background image storage means stores a second background image;

the above-mentioned display position storage means stores a second display position in which the icons represented by the above-mentioned second icon data are arranged in a matrix of m rows and n columns;

a menu mode setting means is further provided for setting one of at least two modes of displaying the above-mentioned icon menu and displaying the icons in the matrix;

the above-mentioned background image display means displaying the background image stored in the above-mentioned background image storage means according to the menu mode that is set; and the above-mentioned icon display means displaying the icons stored on the above-mentioned icon storage means at the display position stored in the above-mentioned display position storage means according to the menu mode that is set.

In carrying out the invention and according to still another aspect thereof, there is provided an icon menu display apparatus further comprising:

selected icon storage means for storing data about an icon selected by the above-mentioned icon selecting means; and icon cursor display means for displaying an icon cursor on an icon stored in the above-mentioned selected icon storage means.

The pattern data constituting the icon data stored in the above-mentioned icon storage means is referenced when displaying a design of an icon and the function name data is referenced when displaying a name of a function corresponding to the icon.

The above-mentioned icon data, the background image data stored in the background image storage means, and the display position data stored in the display position storage means are referenced to display the perspective view of the workroom having a desk as the background of the icon menu and display the plurality of icons on the background.

The icon menu display apparatus further comprises a second icon menu which is displayed with the above-mentioned icons laid out over the entire screen in the matrix of m rows×n columns by referencing the above-mentioned second icon data, second background image data, and second display position data. The first icon menu and the second icon menu are selected between by the menu mode set by the above-mentioned menu mode setting means. It should be noted that m and n represent given integers.

When processing of a function is ended to display one of the icon menus again, the icon menu is displayed by displaying the icon cursor at the selected icon.

In carrying out the invention and according to yet another aspect thereof, there is provided an icon menu display method comprising the steps of:

storing beforehand data necessary for displaying each of a plurality of types of background images and a plurality of icons, the data providing icon display information at least including a plurality types of icon data for specifying a form of an icon for display, and icon data specifying information for specifying which type of the icon data is to be used for the display;

determining, when displaying a menu, which of the background images stored beforehand is to be used for display;

referencing the icon data specifying information stored beforehand to determine icon data to be used for display in the determined background image; and displaying the determined background image and icon data on a display screen.

In carrying out the invention and according to a further aspect thereof, there is provided an icon menu display system comprising:

first storage means for storing a plurality of background images;

second storage means for storing information necessary for displaying an icon, the information being composed of icon display information at least including a plurality of types of icon data for each icon to specify a form of the icon for display;

third storage means for storing icon data specifying information for specifying which of the plurality of types of icon data stored in the second storage means is to be used for display for each of the plurality of background images stored in the first storage means;

input means for receiving an instruction to the system;

display object determining means for determining which of the background images stored in the first storage means is to be used for display and determining icon data to be used for display on a selected background image by referencing the icon data specifying information stored in the third storage means; and display means for reading the selected background image and icon data respectively from the first storage means and the second storage means to display them on the screen.

In carrying out the invention and according to still further aspect thereof, there is provided an information processing apparatus comprising:

a central processing unit for performing arithmetic processing;

a storage unit for storing a program and data necessary for performing the arithmetic processing;

an input unit for receiving an instruction issued by an operator; and a display unit.

The above-mention storage unit stores a plurality of types of data for realizing background images;

icon display information necessary for displaying icons and at least including a plurality of types of icon data for specifying a display form of each of the icons; and icon data specifying information for specifying which of the plurality of types of data is to be used for a selected icon and for a selected background image.

The above-mentioned central processing unit determines which of the background images stored in the storage unit is to be used for display, determines icon data to be used for display in the selected background image by referencing the icon data specifying information stored in the storage unit, and reads the selected background image and icon data respectively from the above-mentioned first storage means and the second storage means to send the read background image and icon data to the display unit for display.

As described above, in the present invention, the plurality of background images are stored in the storage unit in advance. This setup makes it possible to perform menu display in the selected one of the background images. Which background image is to be used is determined by the system. The user can instruct the system to select a background image specified by the user.

Also stored in the storage means in advance is the icon display information at least including the plurality of the icon data that is necessary for displaying each of the plurality of icons and specifies a form of a selected icon. Stored in another storage means in advance is the icon data specifying information for specifying which of the plurality of icon data is to be used for display. Consequently, icons having display forms corresponding to a selected background can be displayed.

Which of the plurality of types of icon data is to be used for icons to be displayed against a certain background is determined by referencing the icon data specifying information.

The above and other objects, features and advantages of the present invention will become more apparent from the accompanying drawings, in which like reference numerals

BRIEF DESCRIPTION OF THE DRAWINGS

FIGS. 2(a) through 2(e) show data tables to be used for icon menu display processing of the word processor practiced as a first embodiment of the invention;

FIG. 3 is a diagram illustrating a buffer for holding key input data in the icon menu display processing of the word processor practiced as the first embodiment of the invention;

FIG. 4 is a flowchart indicating an entire processing flow of the icon menu display processing of the word processor practiced as the first embodiment of the invention;

FIGS. 6(a) and 6(b) are data tables to be used in icon menu display processing of the word processor practiced as a second embodiment of the invention;

FIG. 19 is a diagram illustrating a data structure of a third embodiment of the invention;

FIGS. 25(A) and 25(B) show examples of display screens of the third embodiment of the invention.

DESCRIPTION OF THE PREFERRED EMBODIMENTS

This invention will be described in further detail by way of embodiments with reference to the accompanying drawings. The embodiments of the present invention are associated with the icon menu display processing of a Japanese-language word processor with an icon menu display method according to the present invention applied to an initial menu screen to be displayed when the word processor is powered on. The embodied word processor is composed of the hardware shown in FIG. 1 and a program for controlling the hardware.

Figure 1:
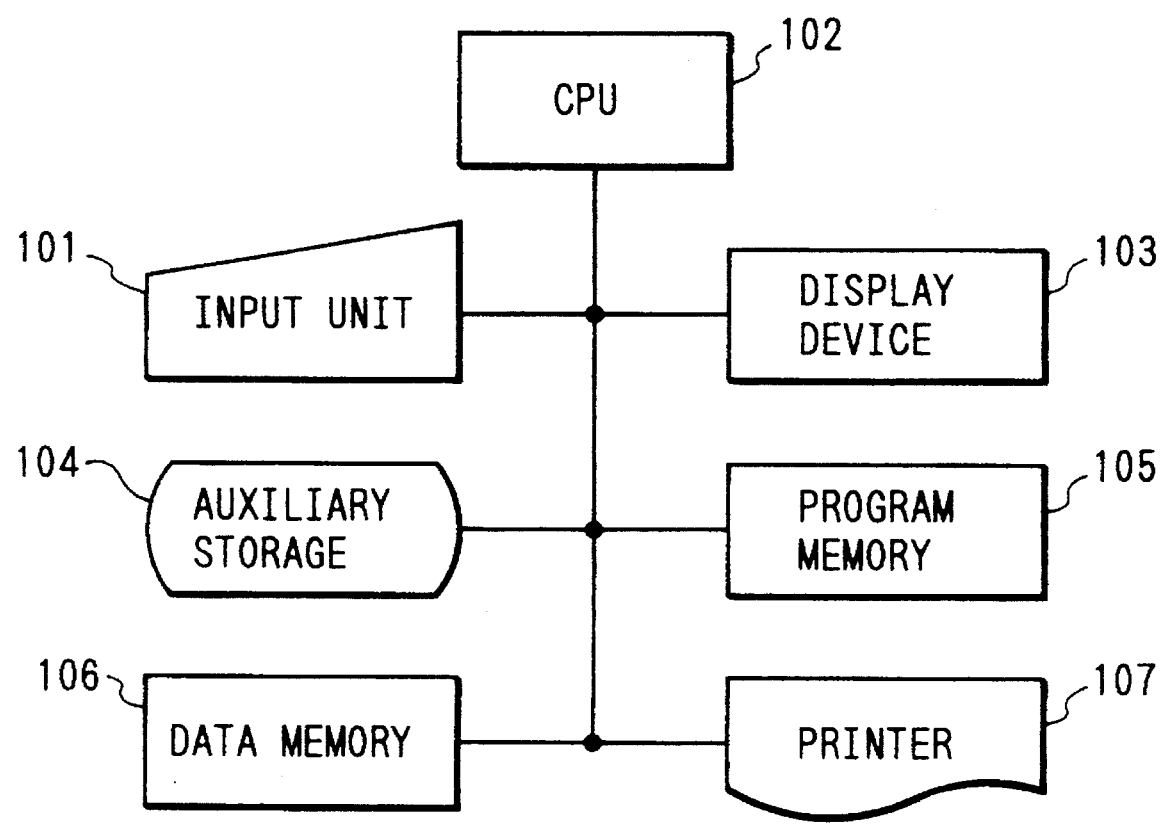
FIG. 1 is a block diagram illustrating hardware constituting the word processor practiced as one embodiment of the invention.

Now, referring to FIG. 1, the hardware system constituting the word processor embodied according to the present invention comprises an input unit 101 having a power switch, cursor keys and numeric keys for selecting a desired icon, namely, a function from an icon menu, an end key for terminating the selected function, and menu mode selector key for selecting a menu to be displayed, a CPU (Central Processing Unit) 102 for controlling the system, and a display unit 103 having a display device such as a CRT for displaying the icon menu.

The above-mentioned word processor further comprises an auxiliary storage 104 storing icon pattern data and icon menu background image data, a program memory 105 storing a program for performing the icon menu display and an application program for defining each of functions of the word processor, a data memory 106 storing function name data constituting icon data of each icon and display position data defining a display position of each icon on a selected background image, and a printer 107 for printing a variety of pieces of data created by the word processor.

Now, the icon menu display of the word processor practiced as a first embodiment of the invention will be described. First, data tables necessary for displaying an icon menu of the word processor will be described with reference to FIG. 2.

Figure 2E:
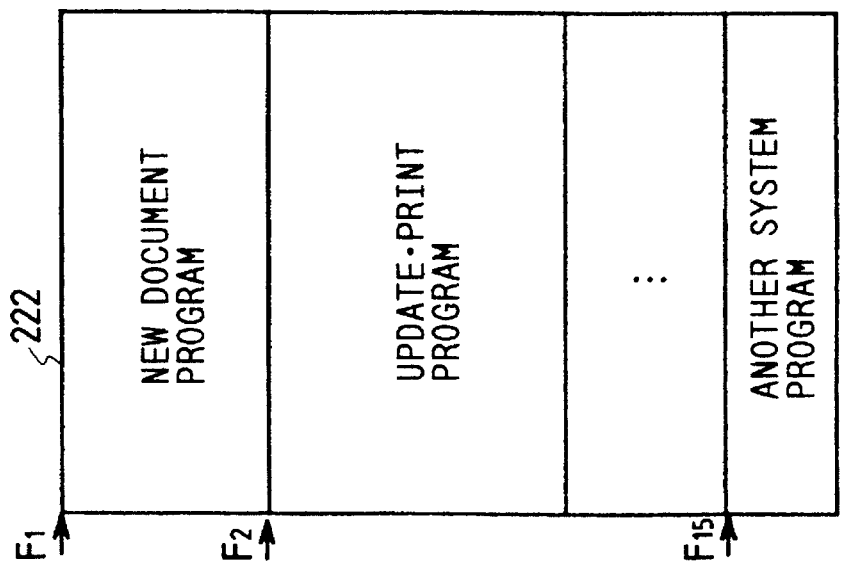

Reference numeral 201 in FIG. 2(a) indicates a menu data table. The menu data table 201 carries a menu number 202 providing an identification number of each menu data, a menu name 203, a menu format 204 for indicating a format in which a menu is displayed, a background image data pointer 205 for indicating an address at which a background image 220 of FIG. 2(c) to be used as a background of a menu is stored, a next layer menu number 206 for indicating a menu located at a next layer, an icon number 207 for indicating an icon to be provided by the menu concerned, and a display position 208 for indicating a display position of each icon in X and Y coordinates on screen. The menus defined in this menu data table 201 are a desk menu 209 and a toolbox menu 210 lying at a layer next to the desk menu. Icons corresponding to functions provided by the embodied word processor are divided into two layers, namely, the desk menu and the toolbox menu.

Figure 2D:
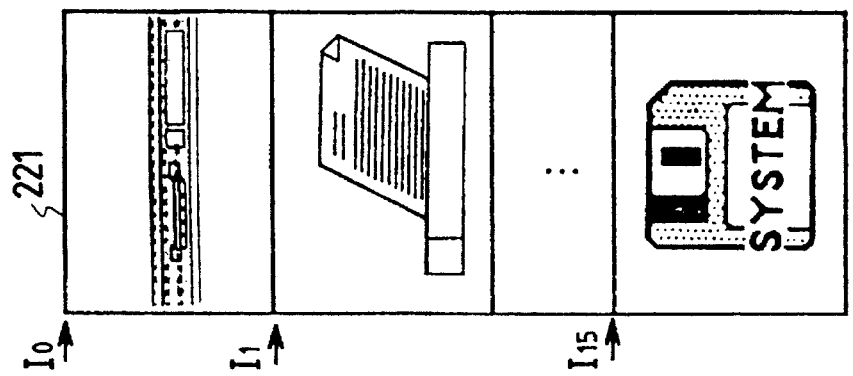
Figure 2C:
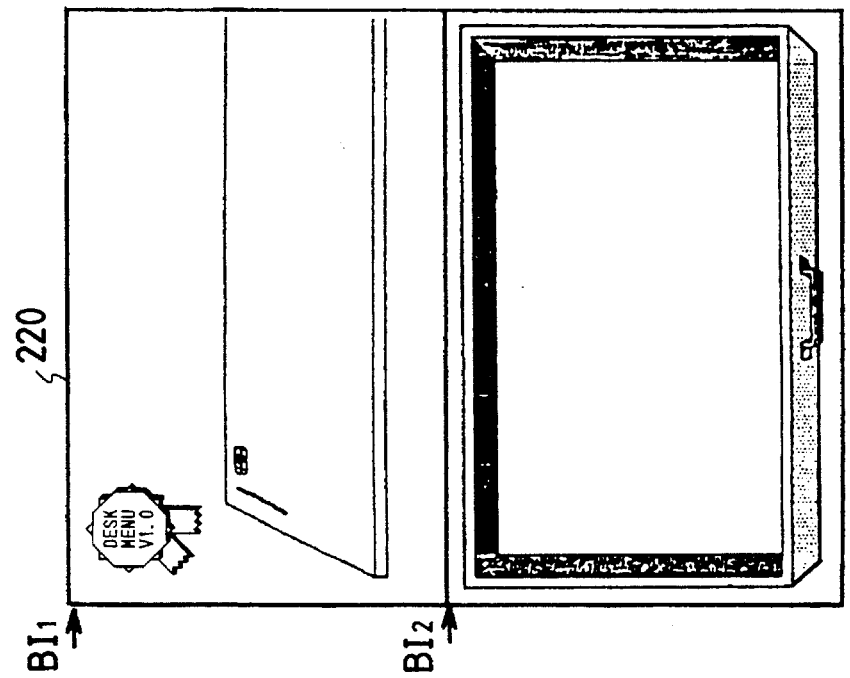

Reference numeral 211 in FIG. 2(*b*) indicates an icon data table holding a plurality of icon data. The icon data table 211 carries an icon number 212 for identifying each icon data, a function name 213 indicating a name of a function corresponding to each icon, a pattern data pointer 214 indicating an address at which a pattern 221 of each icon is stored, and an application program pointer 215 indicating an address at which an application program 222 is stored shown in FIG. 2(*e*) defining a function corresponding to each icon. As is apparent from the icon number 207 of the menu data table 201, of the icon data held in the icon data table 211, a toolbox icon data 216 through a label printing icon data 217 are used in the desk menu 209 and an enlarged character printing icon data 218 through an another system icon data 219 are used in the toolbox menu 210.

Consequently, the icon data about icons corresponding to word processor functions such as document creation and editing can be constituted with pattern data about patterns of paper and function name data called "new document," for example, and the icon is displayed on a desktop represented by a background image.

Further, icon data about icons corresponding to document updating and printing can be constituted with printer pattern data and function name data called "update/print," for example, and the icon is displayed on a desktop represented by a background image.

Still further, icon data about icons corresponding to the creation and editing of address, composition, and pattern to be printed on a postcard can be constituted with letter pattern data and function name data called "Postcard & letter," for example, and the icon is displayed on a desktop represented by a background image.

In addition, icon data about an icon corresponding to a Japanese language dictionary function for retrieving and displaying the meaning of a word by entering the word can be constituted with book pattern data and function name data called "dictionary," for example, and the icon is displayed on a desktop represented by a background image.

Likewise, icon data about an icon corresponding to an address book function for creating and editing an address book can be constituted with book pattern data and function name data called "address book," for example, and the icon is displayed on a desktop represented by a background image.

Now, a buffer in which a value is stored by the user will be described with reference to FIG. 3.

Reference numeral 301 indicates a key input buffer in which a number of an icon is stored. To be more specific, the key input buffer 301 holds a number of an icon selected by an icon selecting operation effected by the user's operating cursor keys or numeric keys.

Now, referring to FIG. 4, a flow of entire icon menu display processing based on the tables of FIG. 2 and the key input buffer of FIG. 3 will be described.

First, the system is initialized by turning on its power in step 410. Then, desk menu display processing is performed in step 402. In step 403, it is determined whether the user has performed a power turn-off operation. If the power turn-off operation has been performed, then, in step 405, termination processing is performed, thereby turning off the power to the system.

If the power turn-off operation has not been performed by the user, then, in step 404, it is determined whether an icon selecting operation has been performed by the user by referencing the key input buffer 301. If the icon selecting operation has been performed, the processing goes to step 406; otherwise, the processing returns to step 402 to be put in a standby state.

In step 406, it is determined whether a selected icon is the toolbox icon 216 by the icon number held in the key input buffer 301. If the icon is the toolbox icon 216, then, in step 408, toolbox menu display processing is performed. Further, in step 410, it is determined whether an icon has been selected from the toolbox menu. If no icon has been selected, the processing returns to step 408 to be put in a standby state. If an icon has been selected, an application program pointer 215 for the selected icon is referenced to activate a corresponding application program in step 411. If the icon selected in step 406 is not the toolbox icon, the processing goes to step 407 to determine whether the selected icon is an icon in the toolbox menu. If the selected icon is an icon in the toolbox menu, toolbox menu display processing is performed in step 409 to activate an application program corresponding to the icon selected in step 411. If it has been found in step 407 that the selected icon is not an icon in the toolbox menu, the toolbox menu display processing is not performed; instead, a corresponding function is activated in step 411. When the application program has been executed, the desk menu is displayed again and the system enters a standby state.

Figure 5:
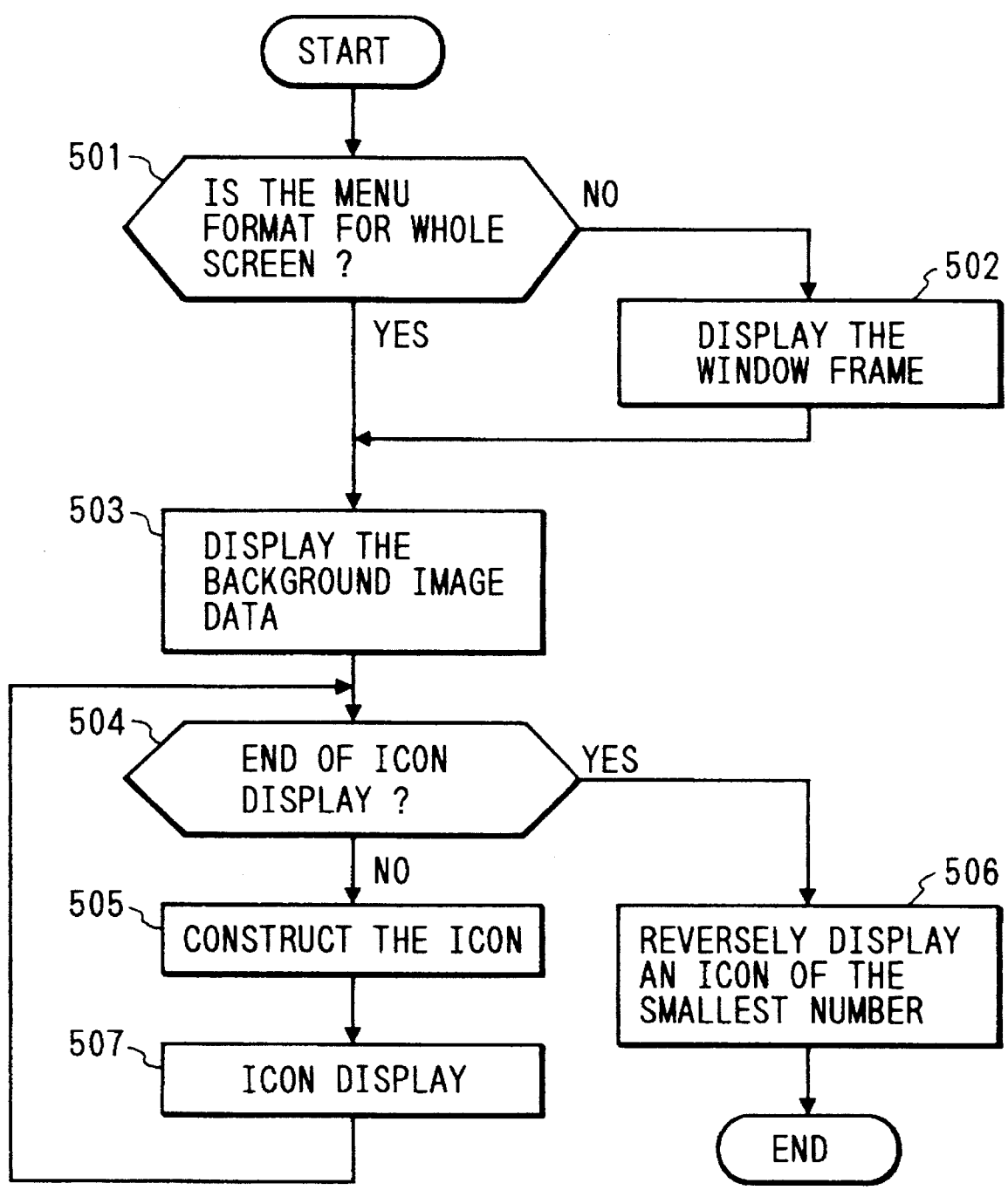
FIG. 5 is a flowchart indicating a processing flow of each menu display in the icon menu display processing of the word processor practiced as the first embodiment of the invention.
Figure 7A:
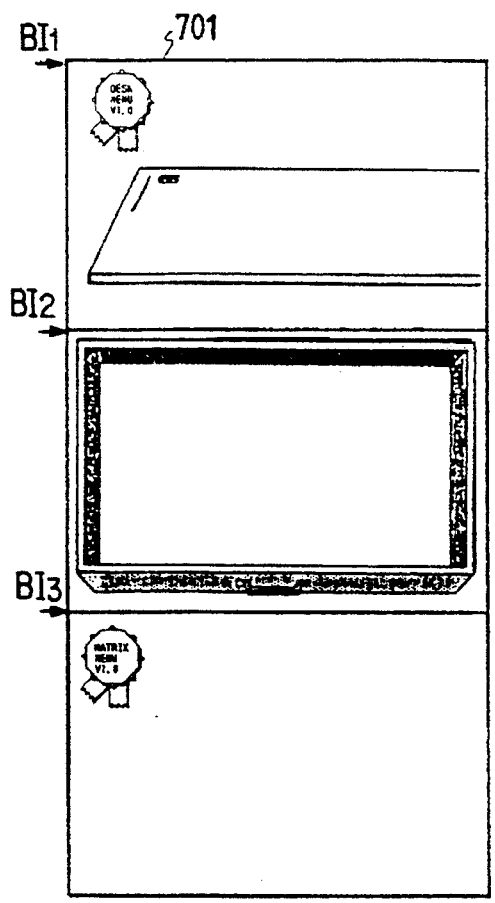
FIGS. 7(a) through 7(d) are data tables to be used in the icon menu display processing of the word processor practiced as the second embodiment of the invention.
Figure 7B:
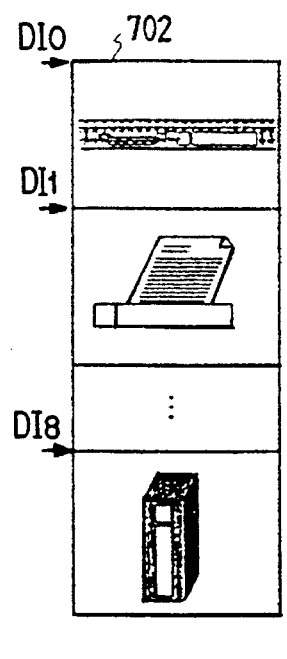
Figure 7C:
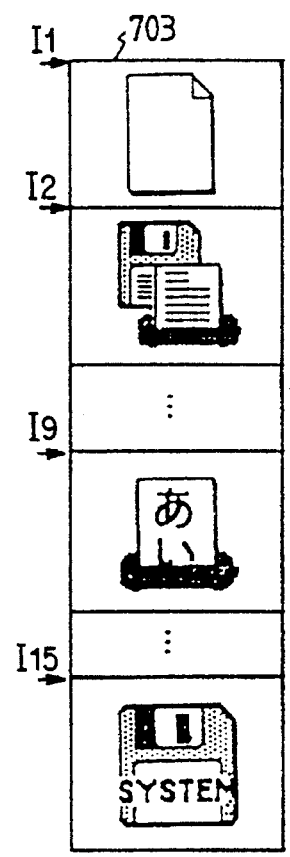
Figure 7D:
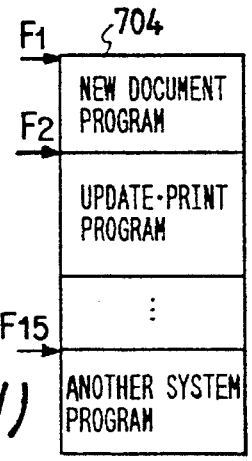

Referring to FIG. 5, the processing flow of the desk menu display in step 402 and the toolbox menu display in steps 408 and 409 will be described.

First, a format of a menu to be displayed is referenced from the menu table 201 in step 501. If the menu format is of whole screen type, the background image 220 indicated by the background image data pointer 205 is displayed over the whole screen in step 502. If the menu format is of pop-up type, a pop-up window frame is displayed in step 502 and the background image 220 is displayed in the window.

Then, in step 504, the icon number data 207 of the menu data table 201 is referenced to determine whether all icons have been displayed. If not, in step 505, an icon to be displayed is constructed by referencing the function name data 213 of the icon data corresponding to the icon number data 207 in the icon data table 211 and the pattern data 221 indicated by the pattern data pointer 214. In step 507, the constructed icon is arranged in the screen for display according to the display position data 208 of the menu data table 201. Then, back in step 504, it is determined whether all icons have been displayed. If yes, in step 506, an icon having a lowest number 212 is displayed in reverse (that is, as a negative image, such as the new document icon shown, for example, in FIG. 11). The reverse display denotes an icon cursor denoting that the icon having the lowest number is in a selected state.

Now, icon menu display processing of the word processor practiced as a second embodiment of the invention will be described. In addition to the above-mentioned desk menu, the word processor of the second embodiment has a matrix menu in which icons are displayed in a matrix of m rows and n columns where m and n are integers. The menu mode for selecting these menus can be set by the user. Further, a selected icon is stored and the icon cursor is automatically displayed at the stored icon.

First, data tables necessary for the above-mentioned icon menu display processing will be described with reference to FIGS. 6 and 7.

FIG. 6(a) is generally the same as FIG. 2(a) except that a menu data table 601 defines three menus, namely, a desk menu 609, a toolbox menu 610 which is one layer up the desk menu, and a matrix menu 611. In the second embodiment, the icons corresponding to word processor functions are displayed in two layers, one in the desk menu, the other in the toolbox menu. In the matrix menu, the icons are displayed all together.

Reference numeral 612 of FIG. 6(b) indicates an icon data table holding a plurality of icons. The table 612 is composed of icon number data 613 identifying the icons, function name data 614 providing names of functions corresponding to the icons, a pattern data pointer 615 indicating addresses at which pattern data 702 of icons of FIG. 7(b) to be displayed in the desk menu are stored, a pattern data pointer 616 indicating addresses at which pattern data of icons of FIG. 7(c) to be displayed in the matrix menu and the toolbox menu are stored, and an application program pointer 617 indicating addresses at which application programs of FIG. 7(d) defining the functions corresponding to the icons are stored. Since there are two types of pattern data pointers, it is clear that patterns of a new document icon 619 through a label printing icon 620 are different from the patterns of eight icons from the new document icon 619 to the label printing icon 620 to be displayed in the desk menu 609 and different from the above-mentioned icon patterns to be displayed in the matrix menu. It should be noted that a toolbox icon 618 is not displayed in the matrix menu.

Seven icon patterns from an enlarged character printing icon 621 to a system icon 622 are the same as those to be displayed in the matrix menu 611. That is, for these seven icons, pattern data 703 are shared between the toolbox menu and the matrix menu.

Figure 8:
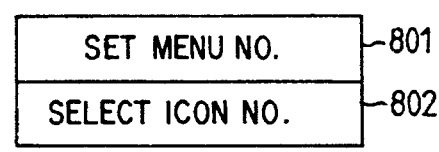
FIG. 8 is a diagram illustrating a buffer for holding a variety of values entered by the user of the word processor practiced as the second embodiment of the invention.

Now, a buffer in which values are stored by the user will be described with reference to FIG. 8.

Reference numeral 801 indicates a menu mode buffer in which a number of a setting menu is stored as a value when the user enters a menu mode selector key. That is, if a menu that has been set is the desk menu, "1" is stored; if it is the matrix menu, "3" is stored.

Reference numeral 802 indicates a selected icon number buffer. This buffer holds, as a value, a number of an icon selected by the user with a cursor key or a numeric key from a plurality of icons displayed in the desk menu, the toolbox menu, and the matrix menu. That is, if an icon selected in the desk menu is the new document icon for example, "1" is stored in the buffer; if the icon is the enlarged character printing icon, "9" is stored.

Now, referring to FIG. 9, a flow of the entire icon menu display processing based on the tables of FIGS. 6 and 7 and the buffers of FIG. 9 will be described.

First, in step 901, the user turns on the power to initialize the system. In the initializing processing, the number of the menu set by the user is stored in the menu mode buffer 801 and the number of the icon selected by the user is stored in the selected icon number buffer 802.

In step 902, the menu mode buffer 801 is referenced. If the stored value is "1", the processing goes to step 903 to perform the desk menu display processing. If the stored value is "3", the processing goes to step 904 to perform the matrix menu display processing.

Then, in step 905, it is determined whether the user has turned off the power. If the user has turned off the power, terminating processing is performed in step 907 to turn off the power to the system. If the user has not turned off the power, the processing goes to step 906 to determine whether the user has performed a menu selector key input operation. If the user has performed the operation, the menu number stored in the menu mode buffer 801 is changed in step 908. That is, if the stored menu number is "1", it is replaced with "3"; if the stored number is "3", it is replaced with "1". Then, the processing goes back to step 902 and references the menu mode buffer 801 to display the menu that is set. If the user has not performed the menu selector key input operation, the processing goes to step 909.

In step 909, it is determined whether an icon has been selected by the user through a cursor key or a numeric key. If the icon selection has been made, an icon number 613 of the selected icon is stored in the selected icon number buffer 802. If the icon selection 10 has not been made, the processing goes back to step 902 to display the menu, upon which the system is put in a standby state.

In step 911, the menu mode buffer is referenced again. If a menu mode that is set is the desk menu, the processing goes to step 912. In step 912, the selected icon number buffer 802 is referenced to determine whether a selected icon is the toolbox icon 618. If yes, the toolbox menu display processing is performed in step 914 and the processing goes to step 916. If no, it is determined whether the icon selected in step 911 is an icon included in the toolbox menu in step 913. In step 916, it is determined whether an icon has been selected again from the toolbox menu. If yes, a number an icon 613 selected in step 917 is stored in the selected icon number buffer 802 and the processing goes to step 918.

If the determination made in step 913 is yes, the toolbox menu display processing is performed in step 915. Then, the processing goes directly to step 918 to activate an application program 804 indicated by the application program pointer 617 corresponding to the selected icon. If the determination is no, the processing goes directly to step 918.

In step 919, processing unique to the selected function is performed and the processing of the function is terminated when the user operates an end key. Then, the processing goes back to step 902 to display the menu and the system is put in the standby state.

If the menu mode that is set is the desk menu and the new document icon 619 is selected for example, the new document program providing the function corresponding to the new document icon is activated in step 918.

If the enlarged character printing icon 621 for example is selected in step 909, the toolbox menu is displayed in step 915 and then the enlarged character printing program providing the function corresponding to the icon 621 is activated in step 918.

Further, if the toolbox icon 618 is selected in step 909, the toolbox menu is displayed in step 914. If the another system icon 622 is further selected from the toolbox menu in step 916, an application program providing another system function corresponding to the icon 622 is activated in step 918.

Figure 10:
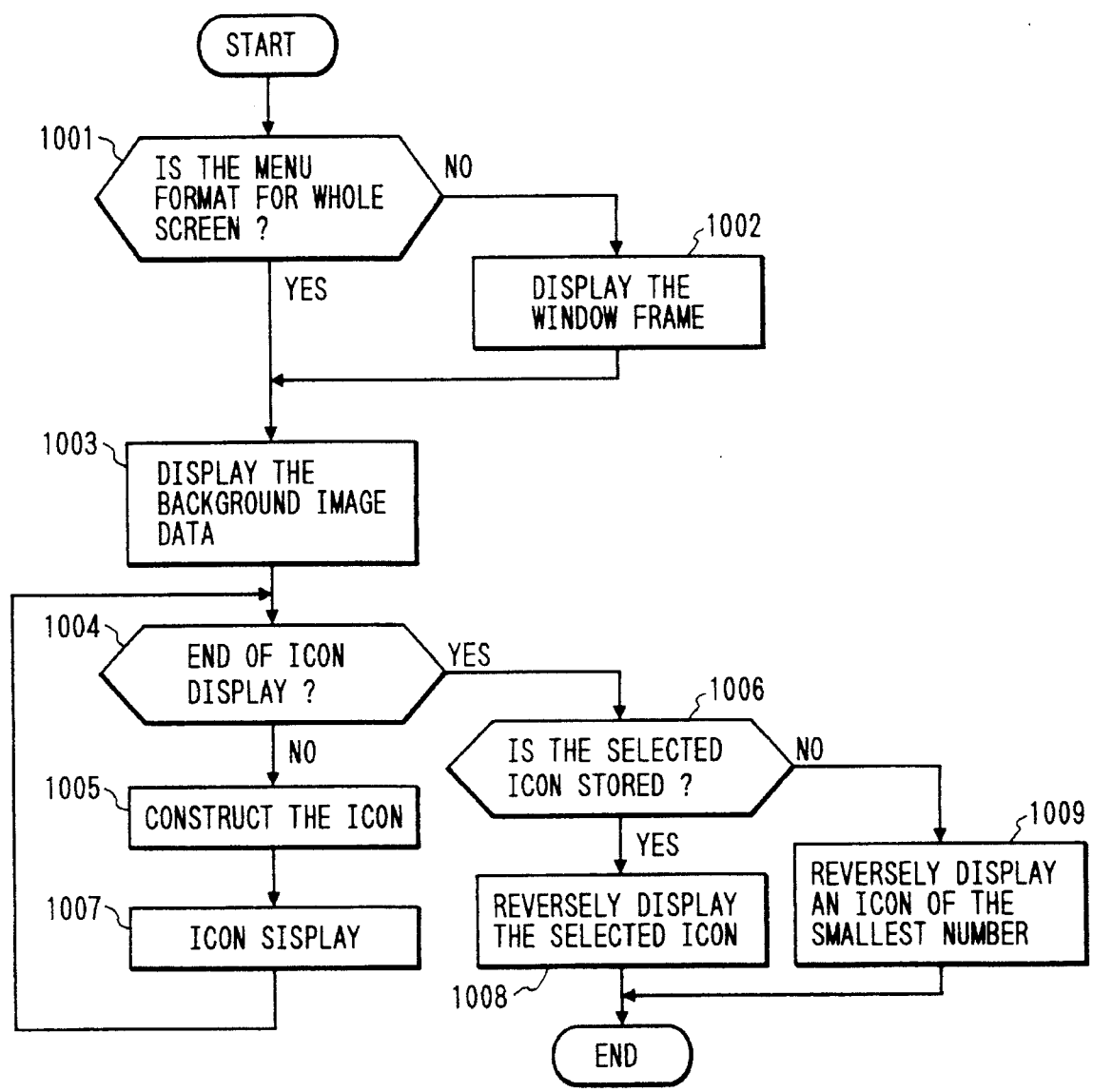
FIG. 10 is a flowchart indicating the processing flow of each menu display in the icon menu display processing of the word processor practiced as the second embodiment of the invention.

Now, flows of the menu display processing shown in steps 903, 904, 914, and 915 will be described with reference to FIG. 10.

First, in step 1001, a format of a menu to be displayed is determined by referencing menu format data 604 stored in the menu data table 601. If the format is the whole screen menu format, the processing goes to step 1003 to reference the background image data pointer 605, thereby displaying background image data 701 over the whole screen. If the format is the pop-up menu format, a window frame is displayed in the screen in step 1002 and the background image data 701 is displayed in the window frame in step 1003.

Then, in step 1004, the icon data 607 stored in the menu data table 601 is referenced to determine whether all icons have been displayed. If no, in step 1005, an icon to be displayed is constructed by referencing the pattern data 702 or 703 indicated by the icon number data 613, function name data 614, and pattern data pointer 615 or 616 held in the icon data table 612. In step 1007, the display position data 608 held in the menu data table 601 is referenced to display the constructed icon on the screen. The processing goes back to step 1004 to determine whether the icon display has been completed. If the icon display has been completed, then, the processing goes to step 1006.

In step 1006, the selected icon number buffer 802 is referenced to reversely display, in step 1008 or 1009, an icon having a number matching the stored value. In step 1008, the toolbox icon 618 is reversely displayed if a menu to be displayed is the desk menu and the selected icon number stored in the buffer 802 is "9" or higher, namely, an icon number of an icon to be displayed in the toolbox menu is stored.

If the buffer 802 holds no value, an icon having a lowest number among the icons contained in the menu displayed in step 1009 is reversely displayed.

In what follows, examples of display screens of the icon menus displayed according to the flow of the above-mentioned entire icon menu display processing will be described with reference to FIGS. 11, 12, 13, and 14.

Figure 9:
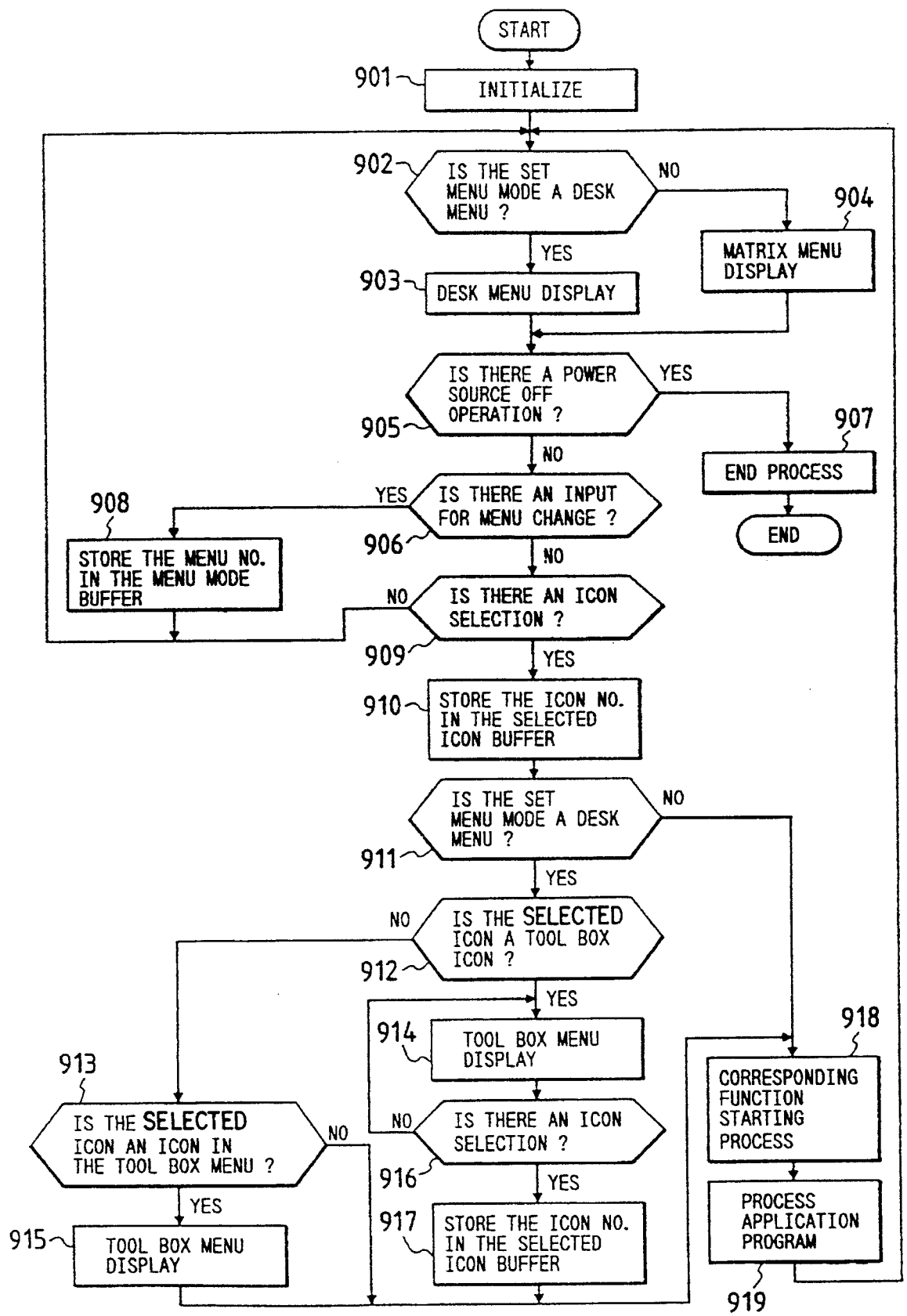
FIG. 9 is a flowchart indicating a processing flow of the entire icon menu display processing of the word processor practiced as the second embodiment of the invention.
Figure 11:
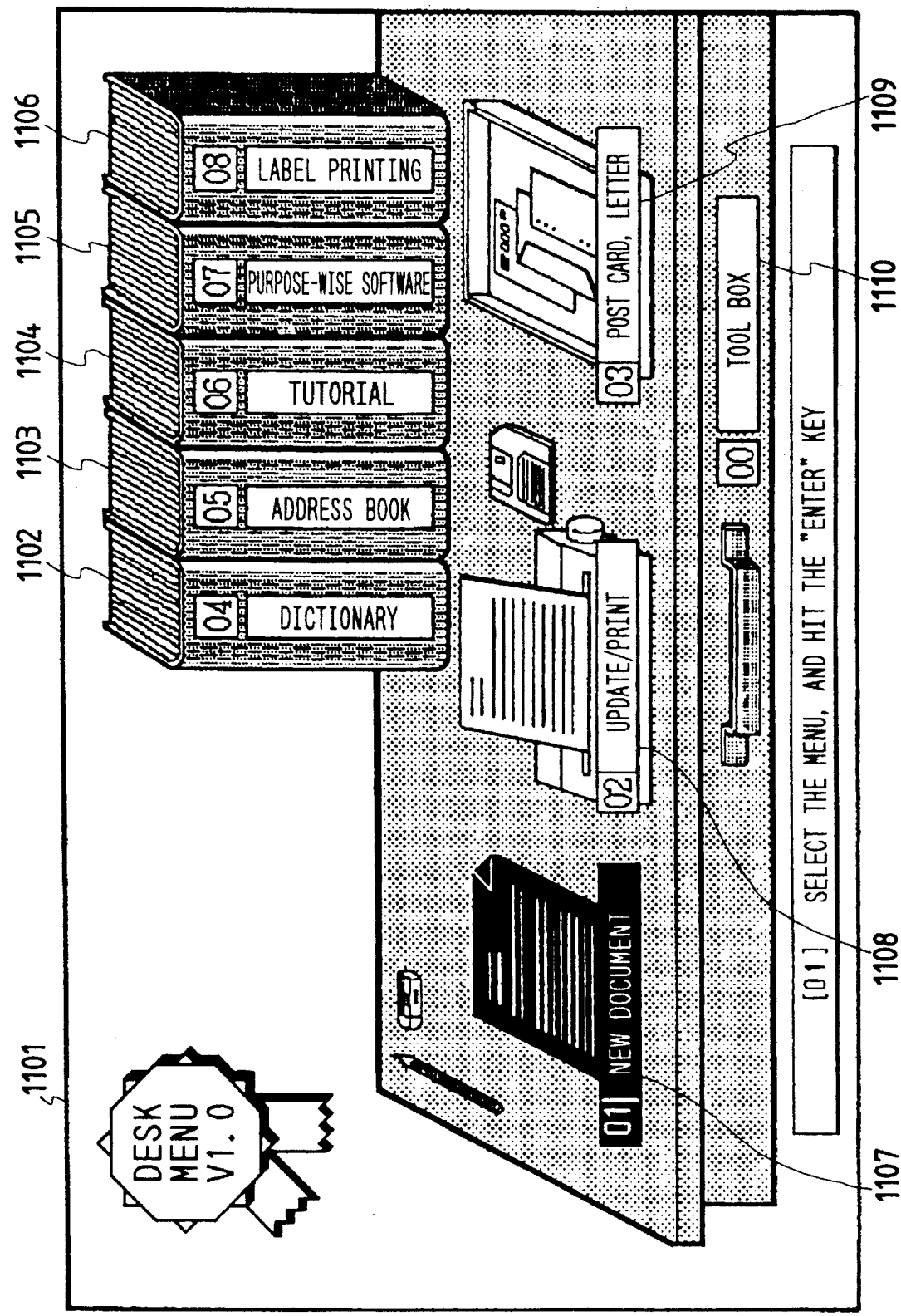
FIG. 11 shows an example of a desk menu display screen of the word processor practiced as one embodiment of the invention.

Referring to FIG. 11, a screen 1101 is a screen for displaying the desk menu whose display processing is performed in step 903 of FIG. 9. The screen 1101 shows, in book forms, a dictionary icon 1102, an address book icon 1103, a tutorial icon 1104, a software-by-purpose icon 1105, and a label printing icon 106 on top of a desk that provides a background. Also laid on the desk are a new document icon 1107 in a form of paper, an update/print icon 1108 in a form of printer, and a postcard & letter icon 1109 in a from of postcard and letter. In the figure, the new document icon 1107 is reversely displayed due to the reverse display processing performed on the selected icon in step 1009.

Figure 12:
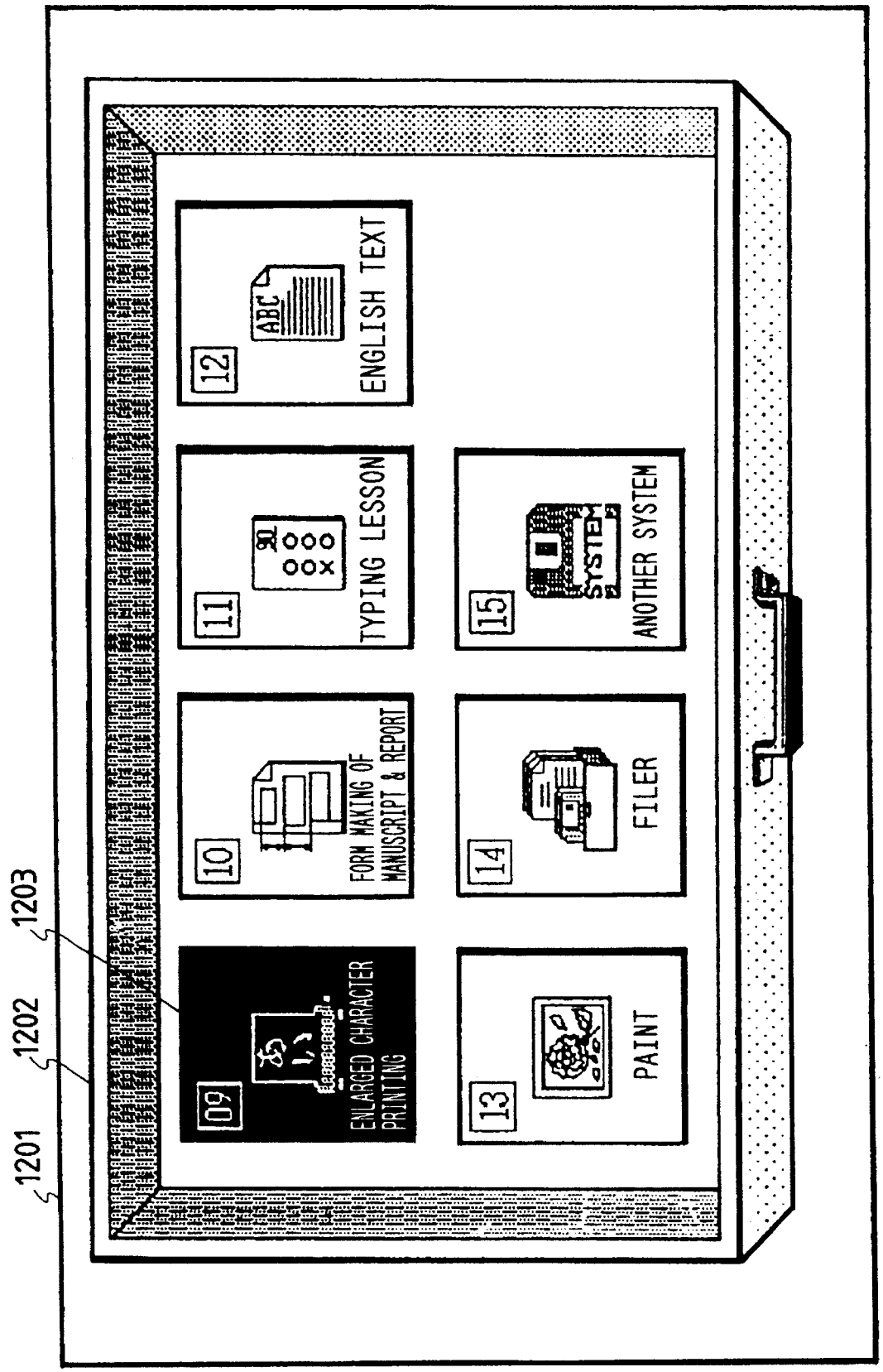
FIG. 12 shows an example of toolbox menu display screen of the word processor practiced as one embodiment of the invention.

Under the desk top, a toolbox icon 1110 is displayed in a form of drawer. When the toolbox icon is selected, the toolbox menu display processing described in steps 914 and 915 of FIG. 9 is performed to display a toolbox menu 1202 shown in a screen 1201 of FIG. 12 is displayed in a pop-up form. Then, when the processing described in step 1009 is performed, an enlarged character printing icon 1203, which has a lowest value among the icons contained in the toolbox menu is reversely displayed.

Figure 17:
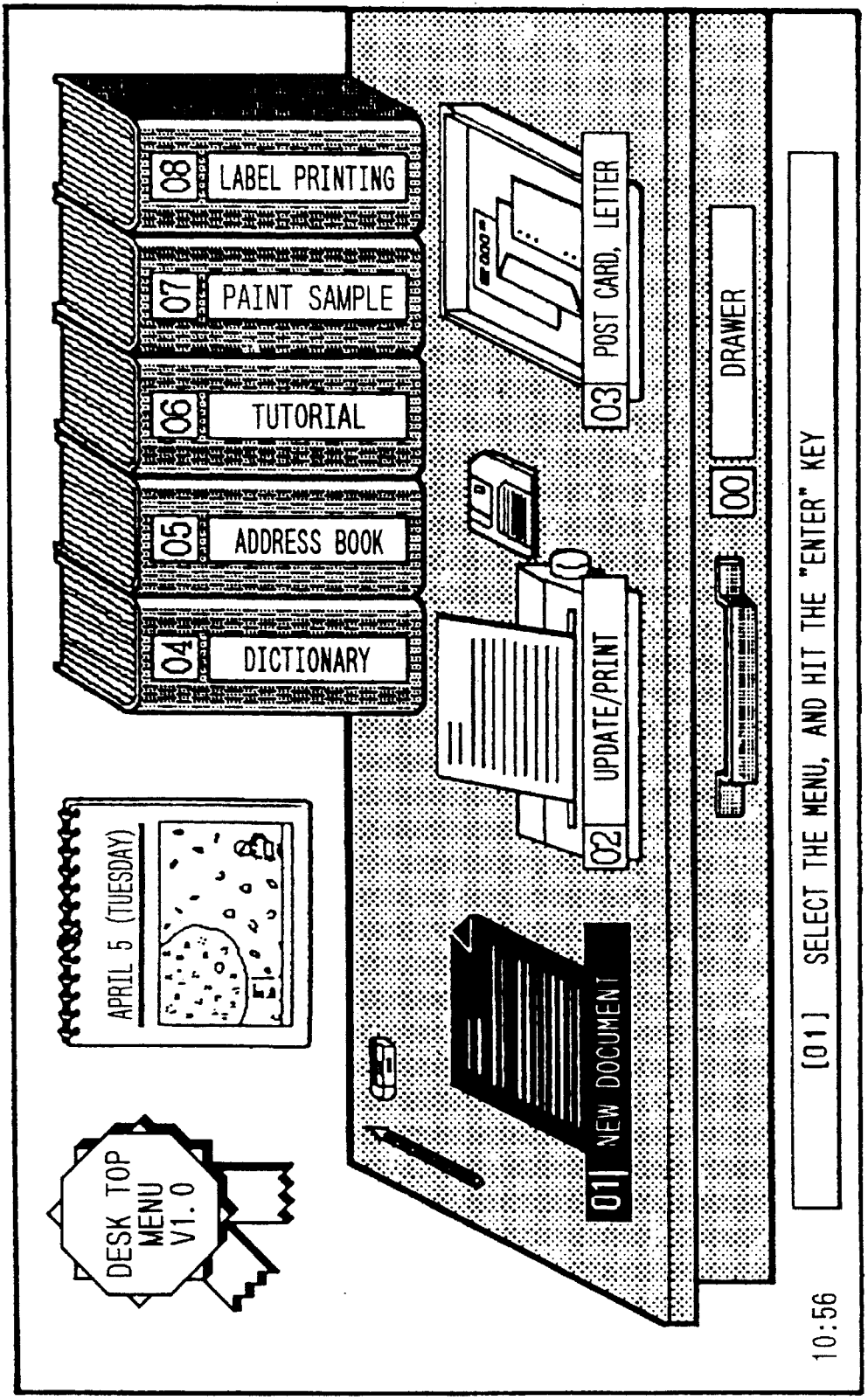
FIG. 17 shows an example of another desk menu display screen of the word processor practiced as one embodiment of the invention.
Figure 18:
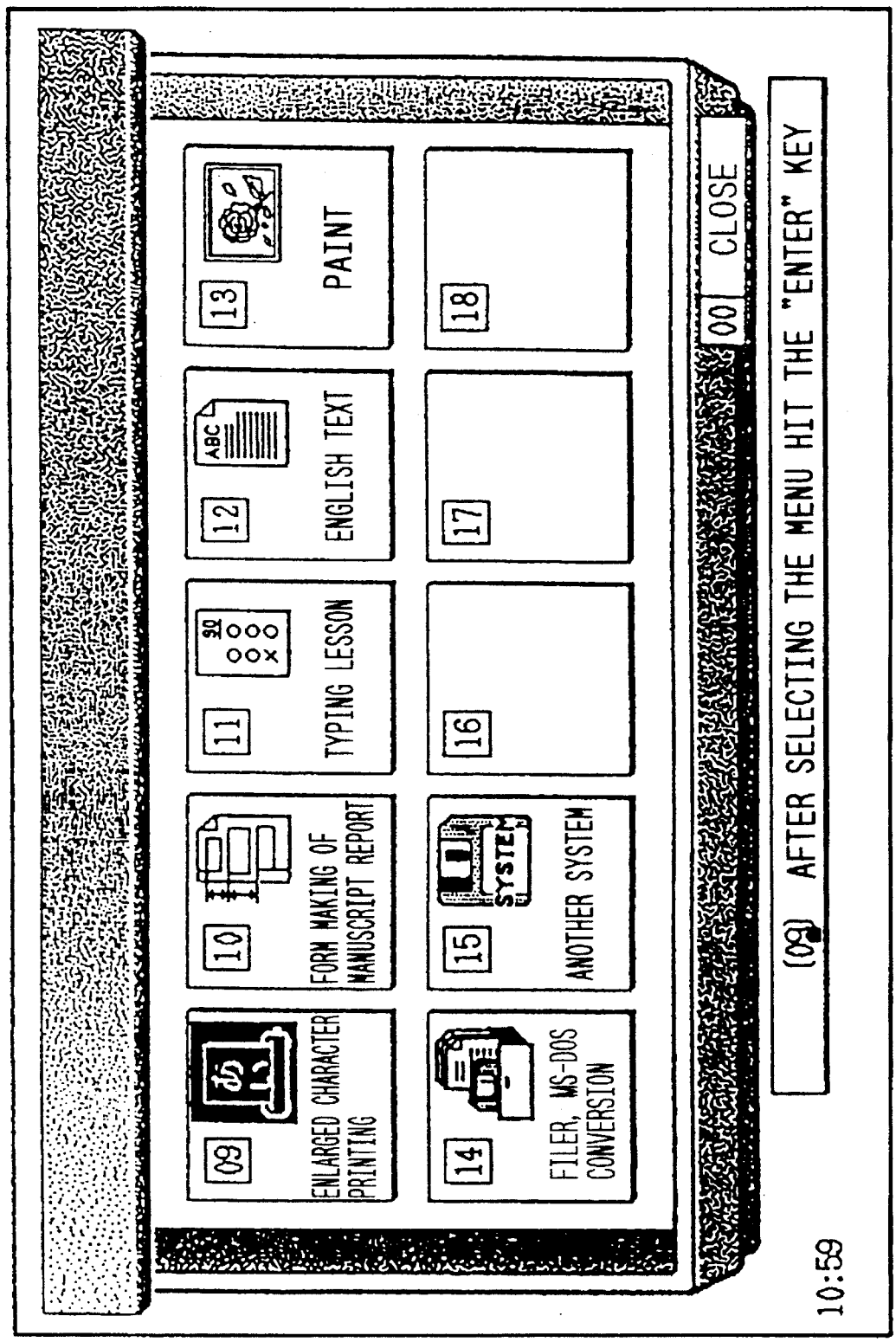
FIG. 18 shows an example of another toolbox menu display, screen of the word processor practiced as one embodiment of the invention.

It will be apparent that designs of icon pattern data, function name data, and background image data that constitute the desk menu are not necessarily limited to those shown in FIG. 11; they may be those shown in FIG. 17 for example. Likewise, a design of the toolbox menu is not necessarily limited to that shown in FIG. 12; it may that shown in FIG. 18 for example.

Figure 13:
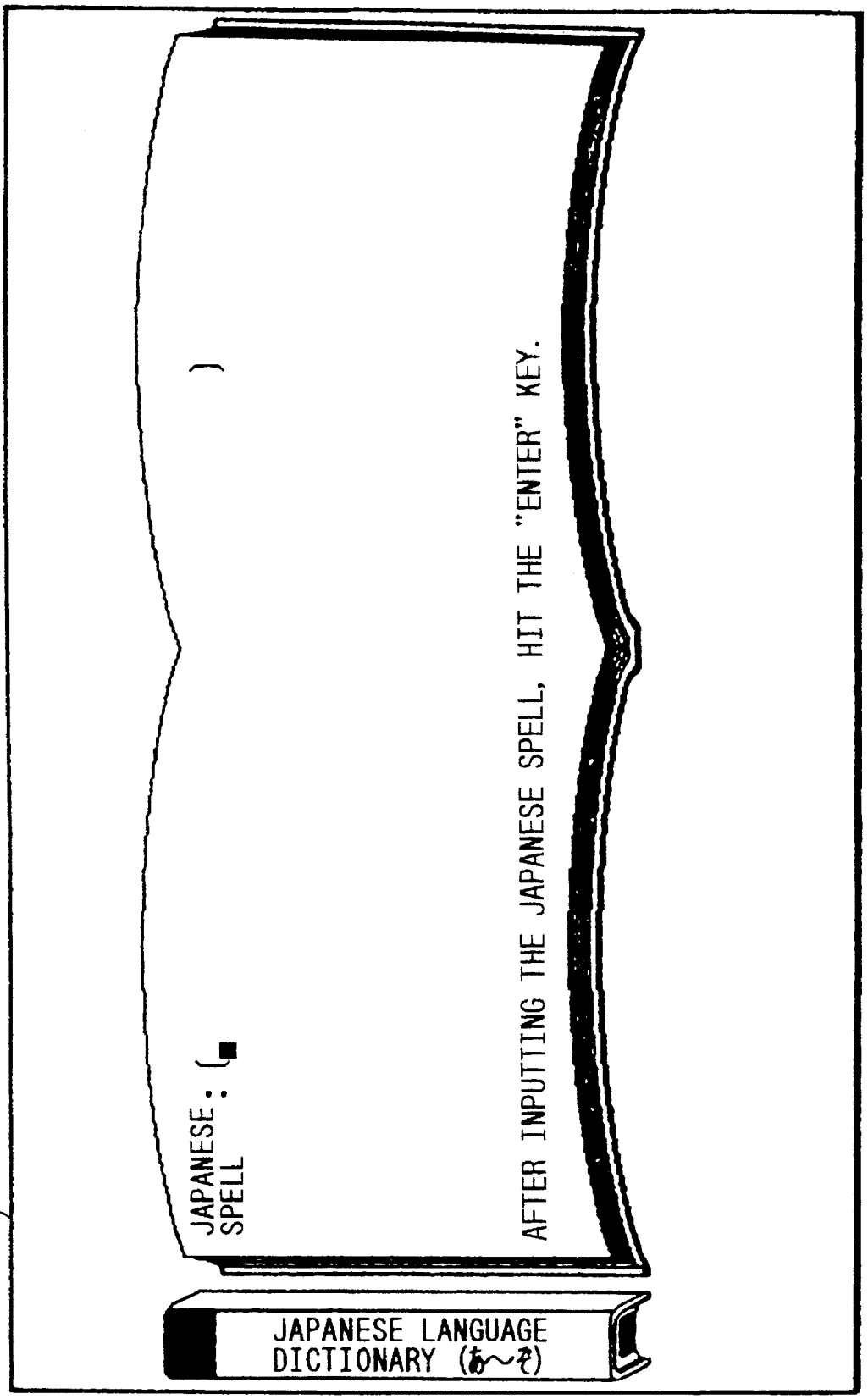
FIG. 13 shows an example of display screen to be displayed when activating a Japanese language dictionary capability of the word processor practiced as one embodiment of the invention.

When a dictionary icon 1102 of FIG. 11 is selected, the Japanese dictionary function is activated by the function activation processing described in step 918 of FIG. 9 to display a screen 1301 of FIG. 13.

Figure 14:
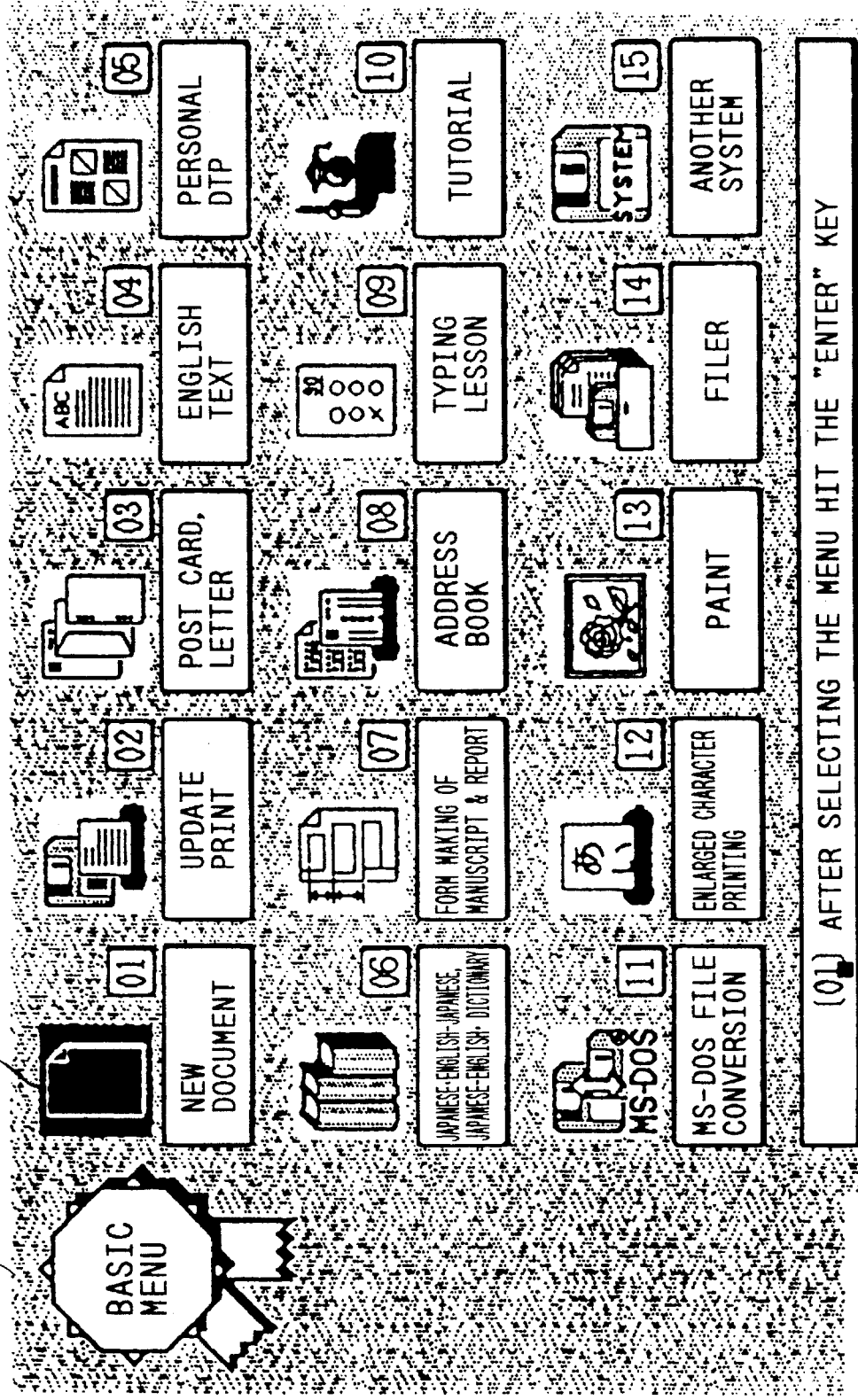
FIG. 14 shows an example of a matrix menu display screen of the word processor practiced as the second embodiment of the invention.

When the user operates the menu selector key, the matrix menu display processing described in step 904 of FIG. 9 is performed to display a matrix menu shown in a screen 1401 of FIG. 14. In this matrix menu, icons are laid out in a matrix of 3 rows×5 columns. As with the case of the desk menu display, the icon cursor is located at a new document icon 1402.

Now, referring to FIG. 15, status transitions describing operations by the user of the word processor practiced as the second embodiment of the invention will be described by following the icon menu display processing according to the second embodiment.

Figure 15:
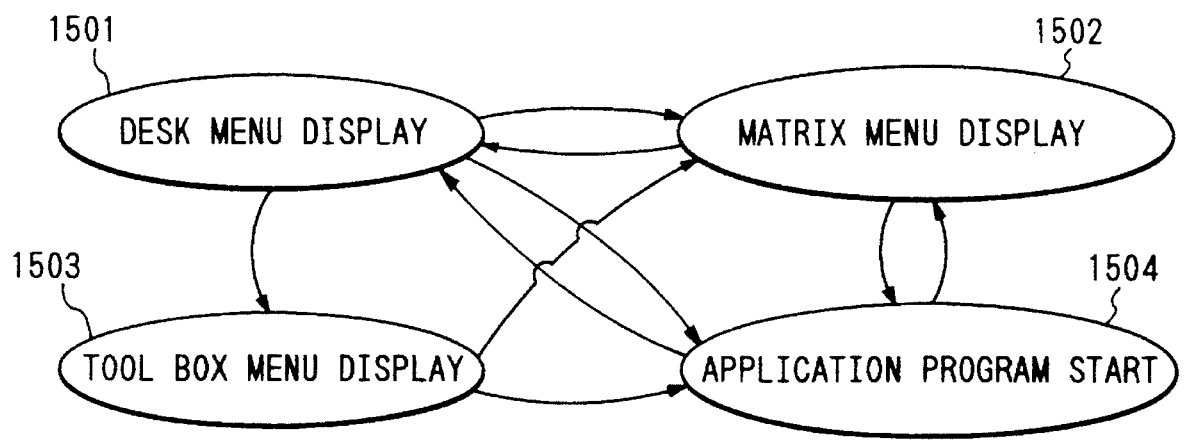
FIG. 15 shows a status transition diagram obtained by an operation by the user of the word processor practiced as the second embodiment of the invention.

FIG. 15 shows four status transitions that take place by user operations. First, when the user turns on the power, the system enters a desk menu display state 1501. When the user selects the toolbox icon in this state, the system enters a toolbox menu display state 1503. Further, when the user operates the menu selector key in the state 1501 or 1503, the system enters a matrix menu display state 1502. When the user selects an icon other than the toolbox icon in the desk menu display state 1501 or if the user selects an icon contained in the toolbox menu in the matrix menu display state 1502, the system moves to a state 1504 in which a function corresponding to the selected icon is activated. When the function has been performed, the systems moves to the desk menu display state 1501 or the matrix menu display state 1502.

In the above-mentioned first and second embodiments, three types of designs are used for representing icon pattern data; namely, the book-shaped icons displayed on the background, the paper, printer, and letter displayed as desktop icons, and the drawer icon under the top of desk. It will be apparent that these icons may take other shapes as long as they correspond to the icons in positions on the background. For example, icons in shapes of a file, a folder, a document holder may be displayed on the top of the desk to be related to a Filer function or a calculator icon may be displayed to be related to a four-operations function. In addition, a schedule table may be displayed on a wall portion to be related to a scheduler function.

However, a book icon for example is not displayed on the wall portion because it is unreal. That is, there is an inevitable relationship between an icon and its display position on the background.

In the second embodiment, menus to be displayed are changed by the menu mode selector key. The menus can be changed also by setting the menu mode as one of settings of a system operational environment setting capability provided by the embodied word processor. In this case, the above-mentioned menu mode selector key need not be provided on a keyboard for example.

In the second embodiment, the desk menu has the toolbox menu as a next-layer menu and the matrix menu is a single-layer menu having no next-layer menu. It will be apparent that the number of next-layers of each menu is not limited thereto. For example, the desk menu may have the toolbox menu having a stash bag icon, selecting of which displays a third-layer menu in a pop-up window or a switched screen. Also, it is possible to display a plurality of toolbox icons in a first layer and a toolbox menu may be displayed for each of the icons.

In the matrix menu, it is also possible to switch screens by means of a next-page key for example to display icons, if any, that cannot be displayed in a single screen.

In the status transitions of FIG. 15, the system enters the desk menu state when the user turns on the power. It is also possible to put the system in the matrix menu display state 1502 by initial setting at the shipment of the embodied word processor from factory.

Figure 16:
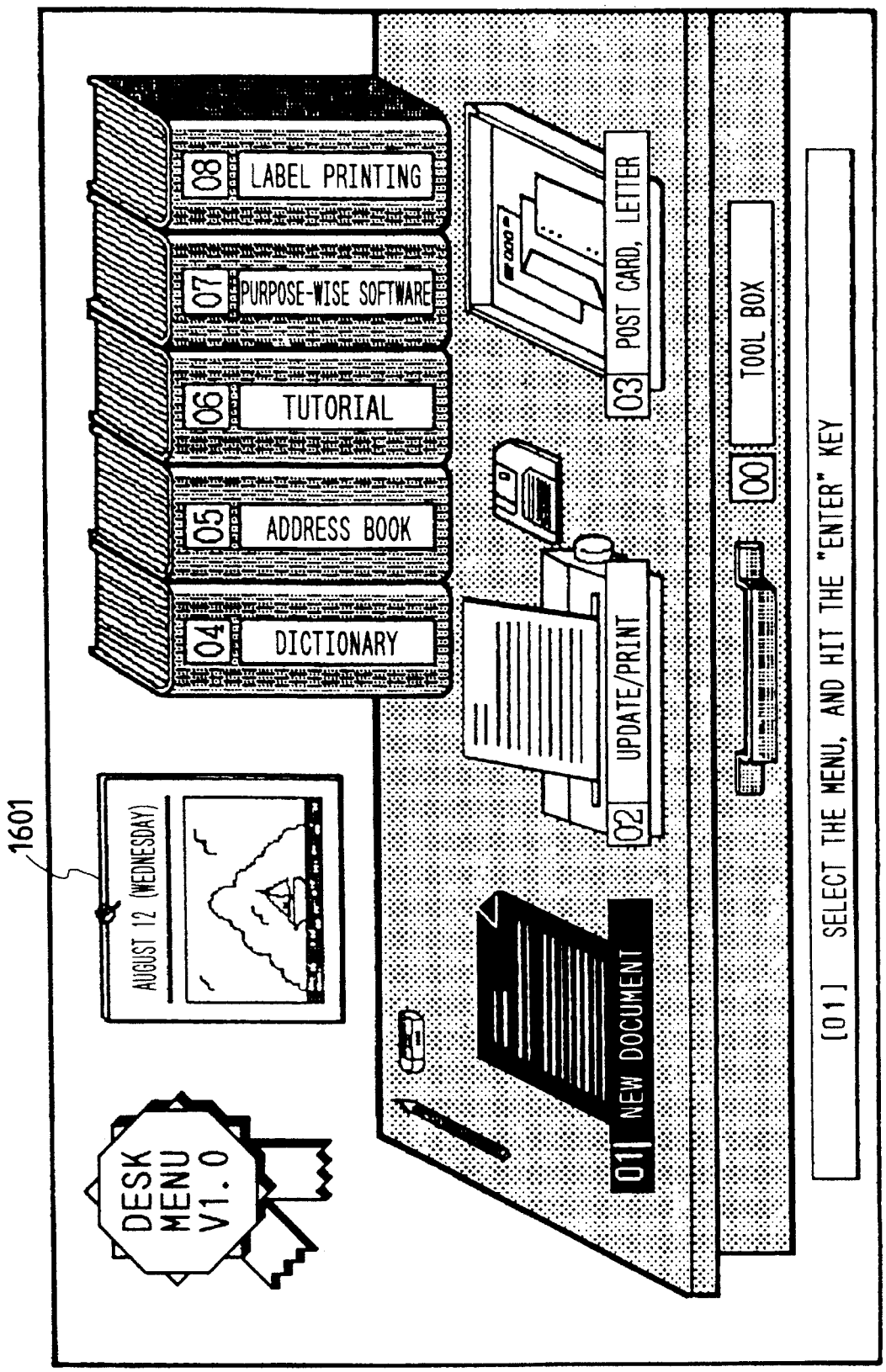
FIG. 16 shows an example of desk menu display screen of the word processor practiced as one embodiment of the invention.

In the above-mentioned two embodiments, the icon menu background image is fixed and therefore does not change. In addition to the above-mentioned icons that are selected by the user to activate functions assigned thereto, it is possible to display a calendar 1601 for example on the wall portion as shown in FIG. 16, pictures drawn on the calendar being changed according to time, date, or season for example. Contrivances such as this provides the icon menus that sensually resemble an actual workroom more closely, thereby enhancing ease of operation of the word processor.

According to the above-mentioned embodiments, the background image data, the pattern data of each icon, and an application program are referenced from the menu data table and the icon data table through the background image data pointer, the pattern data pointer, and the application program pointer, so that the contents of the above-mentioned tables need not be changed if icon patterns are changed or the application program is updated. Since there are the menu data table and the icon data table, and the icons displayed in each menu are represented by the icon number data, the menu data table need not be modified if icon pattern data is changed or an application program is updated for example. Conversely, merely changing icon numbers in the menu data table can modify an icon configuration to be displayed in each menu.

According to the above-mentioned embodiments, a large amount of data such as the background image data and the pattern data are provided separately from each of the above-mentioned table and the data and the tables are connected with the pointers, so that the data can be stored in a mass auxiliary storage such as a hard disk and the menu data table and the icon data table in an internal memory, thus providing a flexible hardware configuration. Additionally, in the above-mentioned embodiments, the pattern data of the icons to be displayed in the toolbox menu and the matrix menu are common between these menus, so that a storage size of the data can be saved.

Further, according to the above-mentioned embodiments, the toolbox icon is provided on the top of desk providing a background image, the toolbox icon displaying a next-layer menu, so that a novice user can easily locate required icons because, for example, icons used more frequently are on the top of desk and icons used less frequently are in the toolbox.

Thus, according to the above-mentioned embodiments, icon menus are provided that the user can easily understand, by analogy, contents of a function corresponding to a particular icon and memorize the icon layout in the screen. The embodiments also provide icon menus that can be easily used by both novice and expert users. Further, the embodiments provide icon menus in which the user can easily make icon selection when in the case where a same function is used repeatedly.

Now, a third embodiment of the present invention will be described with reference to accompanying drawings.

Referring to FIG. 19, there is shown a data structure of the third embodiment. As shown in the figure, the system according to this embodiment has, as information to be displayed on screen, background images 1901 and 1902, display icon tables 1903 and 1904 respectively corresponding to the background images, and a plurality of pieces of icon display information 1900. The above-mentioned images, tables, and information are stored in an internal storage or an external storage of an information processing apparatus to be described. These storage units function as a first storage means for storing the background images 1901 and 1902, a second storage means for storing the display icon tables 1903 and 1904, and a third storage means for storing the plurality of portions of icon display date.

The background images 1901 and 1902 are graphic data for representing backgrounds. For example, these graphic data provide backgrounds shown in FIGS. 25 (A) and (B) to be described. It will be apparent that the background images are not limited to dot data images; they may be vector data images for example.

The icon display information 1900 is provided for each icon. The information consists of an icon name 1905, icon display data 1906, and icon data 1907-1 19072 and so on.

The icon name specifies an icon. For example, there are a new document icon, an update/print icon, an address book icon, a dictionary icon, and an image icon. The icon name is displayed in an icon name display portion 252 provided at a position where an icon having that name is displayed (refer to FIGS. 27(A) and (B)). The icon name data include a character code indicating the name and a code representing contents of a corresponding function. The latter code is used to execute a function indicated by a corresponding selected icon. There is a predetermined relation between the code and a program to be executed. Therefore, when a icon is selected to execute a function, a program corresponding to the code of the selected icon is activated to perform desired processing.

The icon display position data include designation of a background image on which a selected icon is displayed and coordinates indicating a display position on the designated background image. The icon display position is provided with menu selection numbers "00" through "19" as shown in FIGS. 25(A) and (B) in the present embodiment, the menu selection numbers being corresponding to the above-mentioned coordinates. Consequently, a same icon may be displayed at different positions on different background images.

The icon data is composed of graphic data for displaying an icon concerned. The icon data previously provides a plurality of types of graphic data for each icon. In the present embodiment, two types of data are prepared that match the background images 1901 and 1902. Namely, a graphic I1 of FIG. 25(A) represented by a perspective view that matches a desktop view expressing an actual desktop view more truly, and a graphic I2 represented by a top view that matches a top view inside a drawer. These graphic data are not limited to dot data; they may be vector data. Therefore, in the present embodiment, first icons data 1907-1 and 1910-1 indicate perspective view graphics, while second icon data 1907-1 and 1910-2 indicate top view graphics.

In the present embodiment, the icon data include data for displaying a number display portion 251 providing an area for displaying one of the menu selection numbers "00" through "19" and data for displaying an icon name display portion 252 providing an area for displaying a name of an icon displayed as a menu. These pieces of data are provided to match the above-mentioned two types of graphics.

Figure 25B:
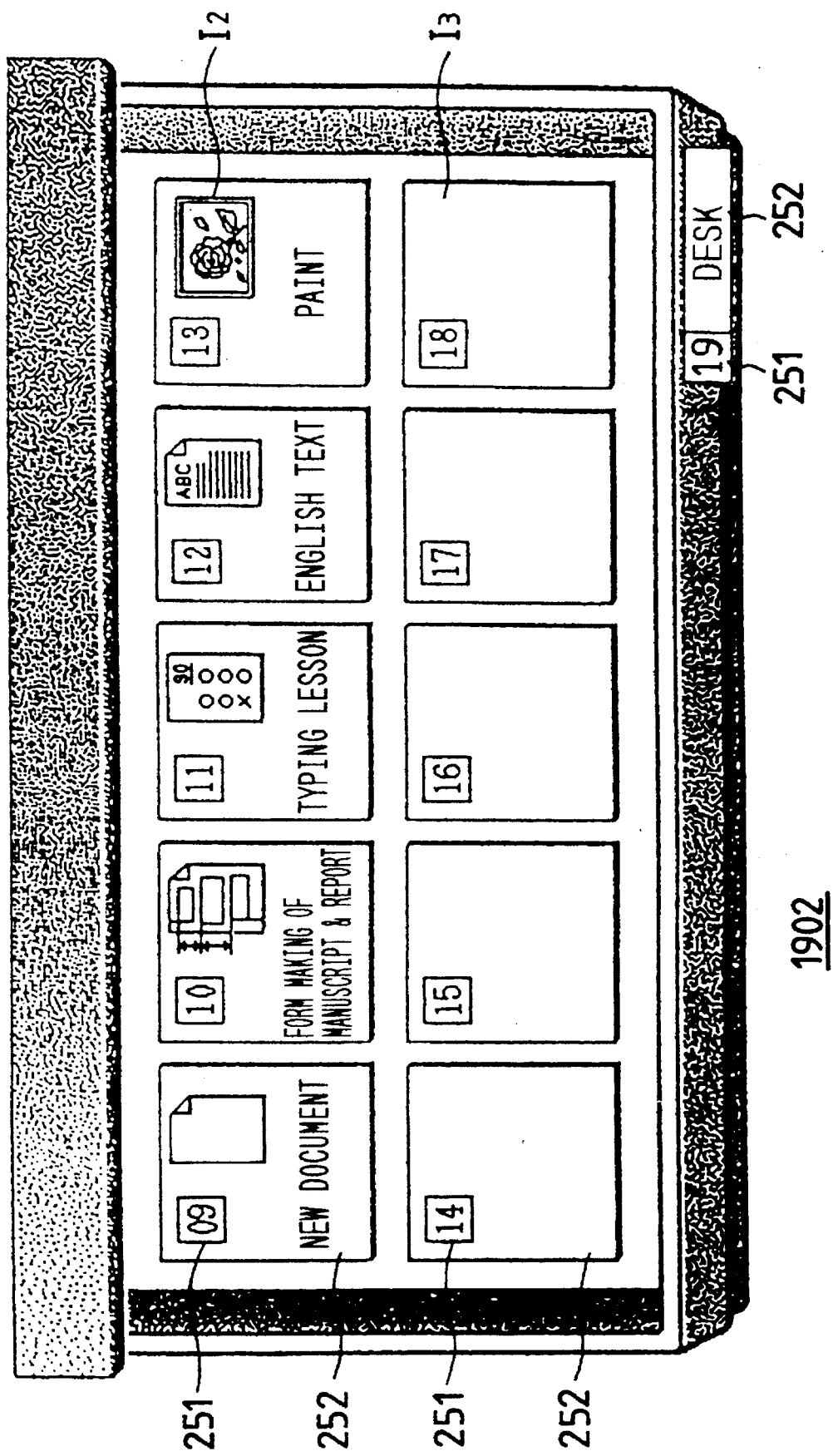

It should be noted that the icon data contains a blank I3 as shown in FIG. 25(B). The blank I3 is defined only in its external form. Namely, it can be regarded that a transparent frame is defined as the blank I3. In the blank I3, no name is defined. This blank icon can be moved into the perspective view of FIG. 25(A). In the perspective view of FIG. 25(A), a pattern on the desk appears through the moved icon without change since the icon is transparent. In the neighborhood of the icon, there are located the number display portion 251 written with a number assigned to that location and the icon name display portion 252 written with no name. It should be noted that, in the present embodiment, the frame of the icon is also transparent, so that the icon cannot be grasped visually. Therefore, the frame may be made visible for convenience.

The background display icon tables 1903 and 1904 of FIG. 19 specify which of the plurality of types of icon data in the icon formation is to be used for display. These tables hold information for specifying the relation between a background image and a form of an icon to be displayed against the background. In the present invention, one form of icons is displayed for each background image. That is, for the background image 1901 of FIG. 25(A), the perspective view form is specified, while, for the background image 1902 of FIG. 27(B), a top view form is specified.

The background images 1901 and 1902 and the icon display information 1900 are prepared by the system beforehand. This frees the user from bothersome jobs such as creation and registration of the background images 1901 and 1902 and definition of icon display information 1900. This is especially advantageous for a busy user, a novice user, or a user unfamiliar with an information processing apparatus. Alternatively, for a user familiar with an information processing apparatus or a user who like to make a variety of system operational settings, part of all of data contained in this icon display information may be modified by the user. This allows the embodied word processing to be widely acceptable.

To be more specific, the data that can be modified by the user include display position coordinates within a background image at an icon display position and icon data. For the background images 1901 and/or 1902, other graphic data may be externally captured, registered, and used for the background images. For example, graphic data created by the user may be used. It is also possible to use image data used on other systems.

Figure 20:
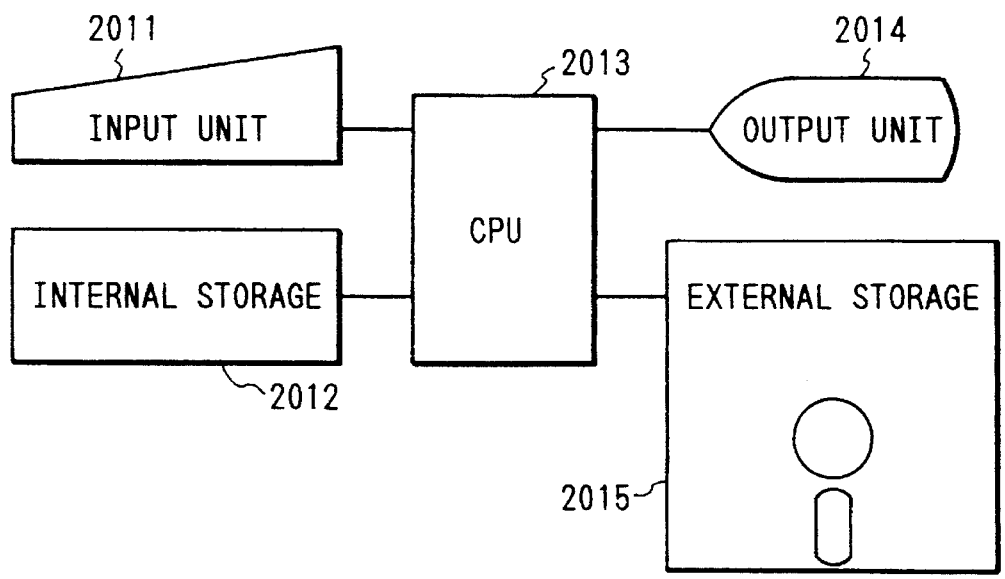
FIG. 20 is a block diagram illustrating one embodiment of the invention.

FIG. 20 is a block diagram illustrating an example of a hardware system configuration of an information processing apparatus to which the present invention is applicable. In the figure, the information processing apparatus comprises central processing unit (CPU) 2013 and an internal storage unit 2014 such as random access memory (RAM) and read-only memory (ROM). The CPU 2013 is connected to an input unit 2011, an output unit 2014 for display, and an external storage unit 2015.

The input unit 2011 is a keyboard for example. A position pointer such as a mouse may be added to the input unit. The keyboard has function keys for selecting and/or instructing a variety of functions, in addition to character keys and numeric keys.

The output unit 2014 is a display device such as a liquid crystal display (LCD) or a cathode ray tube (CRT). Processing results of the CPU 2013 are displayed on the output unit 2014. The processing results at least include an icon menu. The external storage unit 2015 is a magnetic storage unit such as a floppy disk drive.

Figure 22:
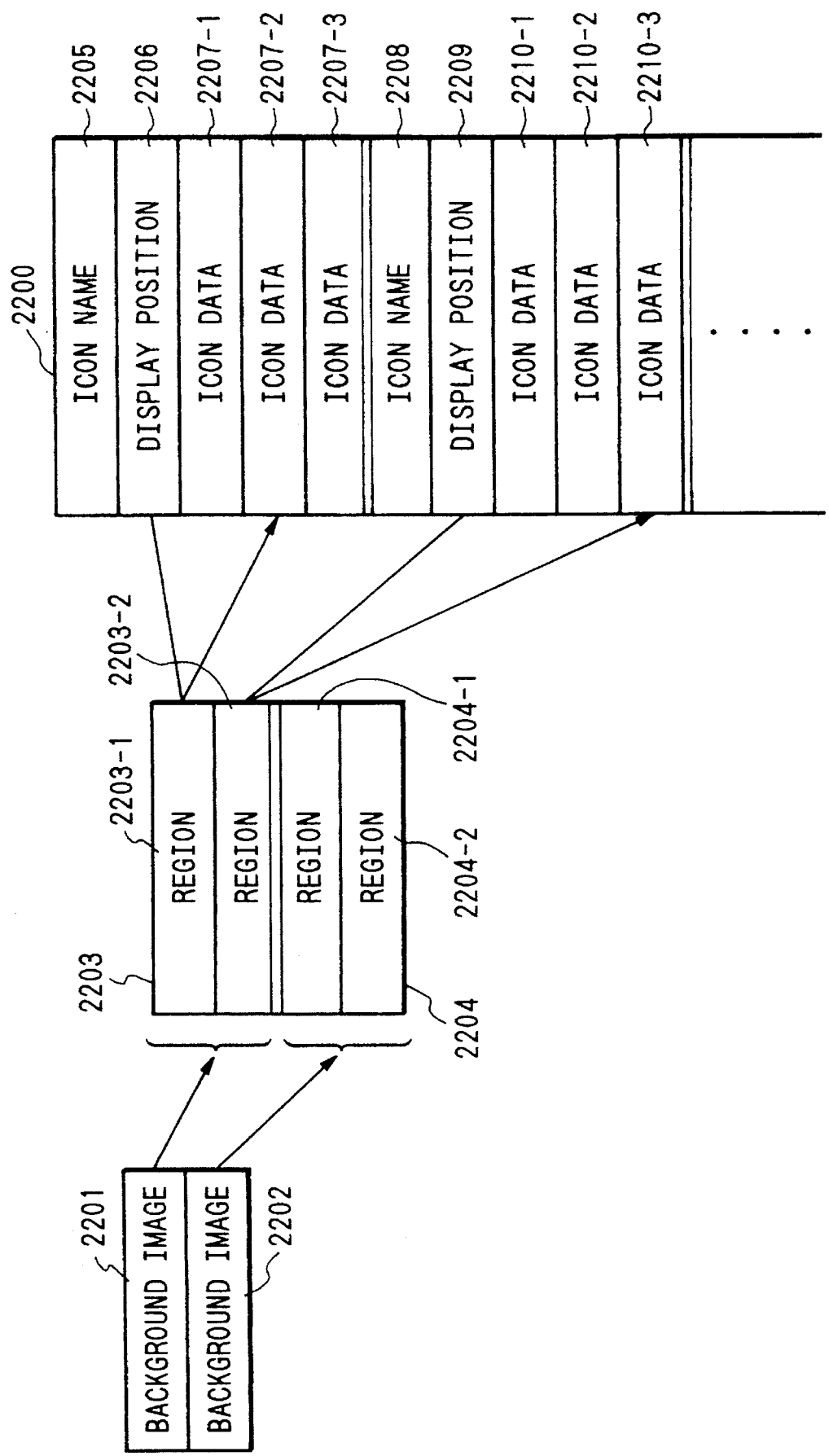
FIG. 22 is a diagram illustrating a data structure of a fourth embodiment of the invention.

The CPU 2013 makes the output unit 2012 perform a specified icon menu display operation in response to data entered from the input 2011 by following a program stored in the internal storage unit 2014 and the data structure of FIG. 19 or FIG. 22 stored in the internal storage unit 2014 or the external storage unit 2015. Namely, the CPU 2013 functions as means for determining a background image or an icon to be displayed. The CPU also performs, according to a menu selection, a selected function by a related program. Further, the CPU performs editing processing for modifying a menu display state. Actual processing to be performed by this information processing apparatus includes word processing for example.

Figure 24:
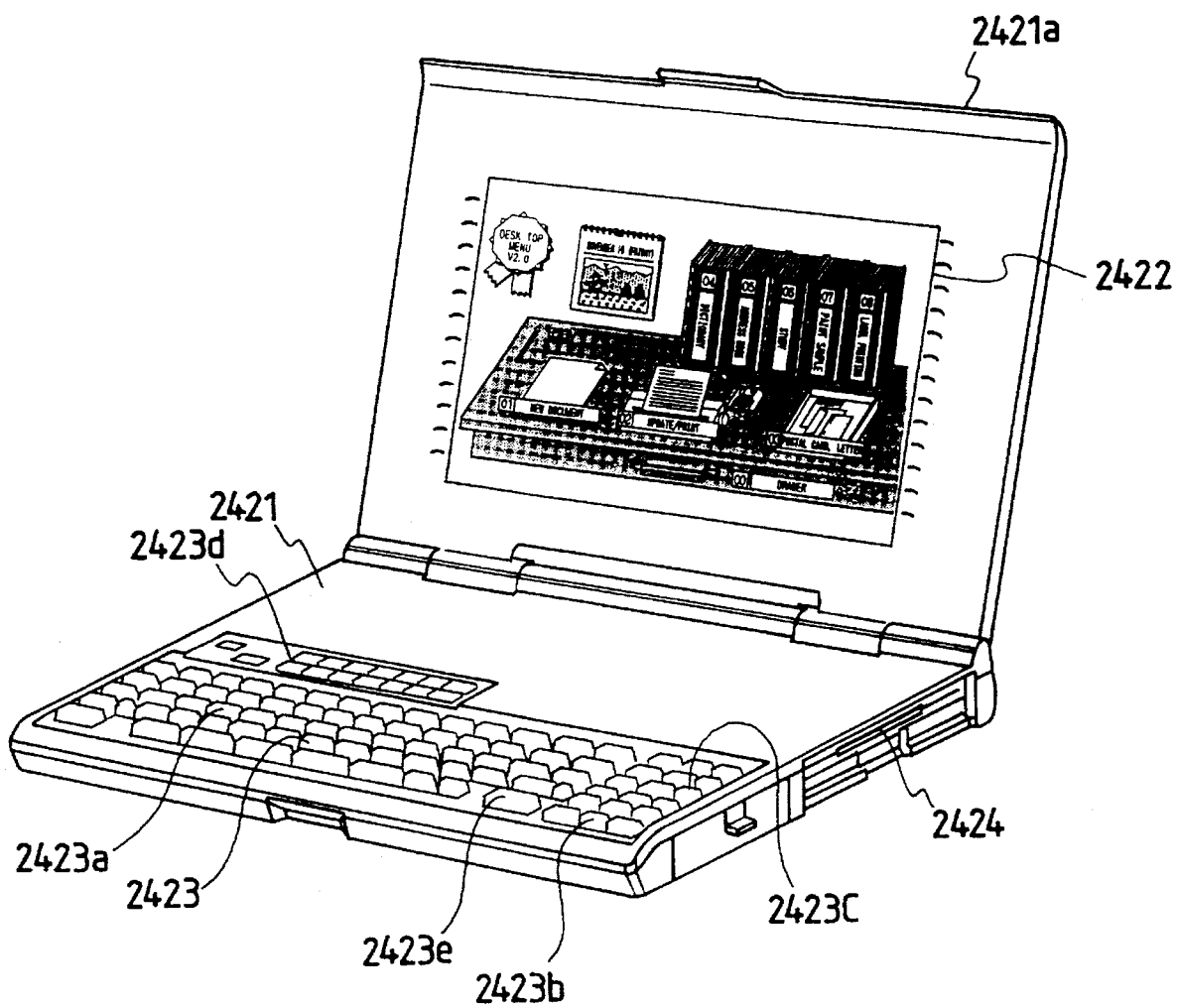
FIG. 24 is a perspective view of one embodiment of the invention.

FIG. 24 shows an example of a perspective view of an information processing apparatus to which the present invention is applied. In the figure, an apparatus main 2421 incorporates the above-mentioned CPU 2013 and the internal storage unit 2014. On top of the apparatus main, there is provided a keyboard 2423 serving as the input unit 2011. On a lid side 2421a of the apparatus main 2421, there is provided a liquid crystal display (LCD) portion 2422 serving as the output unit 2014. Further, on a side edge of the apparatus main 2421, there is provided a floppy disk drive 2424 for example serving as the external storage unit 2015 in which a floppy disk for example is loaded. The LCD portion 2422 are secured to the apparatus main 2421 in an open/close relation with the apparatus main. The LCD portion displays an image with a plurality of icons displayed against a background image, for example.

The keyboard 2423 at least has a character key portion 2423a, a cursor key portion 2423b, a numeric key portion 2423c, a function key portion 2423d for selecting and/or instruction a variety of functions, and an enter key 2423e for instructing program execution.

Now, an operation of the third embodiment of the present invention having the data structure of FIG. 19 will be described with reference to a flowchart of FIG. 21.

First, in step 2101, the CPU 2013 determines a background image to be displayed. As mentioned above, two types of background images are prepared. One of the background images need to be selected. The CPU can receive the selection from the input unit 2011. In the third embodiment, if no selection is instructed by the user, the background image 1901 is preferentially displayed. Hence, if no selection is instructed or if the background image 1901 is selected, the CPU 2013 first determines that the background image 1901 of FIG. 19 is to be displayed. Then, the CPU 2013 displays the first background image 1901 on the output unit 2012 in step 2102. If the other background image 1902 is selected by the user, the CPU recognizes the selection and displays the image.

The currently displayed background image may be changed with the other by specifying a number "00" (drawer) or "19" (desk) of FIGS. 25(A) and (B).

Then, icon display processing is performed. Information necessary for the icon display includes the icon display information 1900 stored in the internal storage unit 2014 and the first display icon table 1903 for example. The CPU searches the icon display position data 1906, 1909 and so on of the icon display information 1900 for an icon to be displayed against the background image 1901. Then, the CPU references the specification of icon data held in the display icon table 1903 to determine, in step 2103, icon data to be used for displaying the searched icon. For each icon to be laid out against the background image 1901, the CPU reads the determined icon data to display the icon at a coordinate position specified by a display position. At the same time, the CPU reads an associated icon name held in the icon name data 1905 to display the read icon name in the icon name display portion 252. Further, the CPU reads an associated number held in the display position 1906 to write the read number to the number display portion 251. Thus, as shown in FIG. 25(A), icons I1 are display against the background image 1901 in step 2104. In the example of FIG. 19, icon data 1907-1 having a first icon name data 1905 indicated by the first display icon table 1903 is displayed at the position indicated by the display position data 1906.

Figure 21:
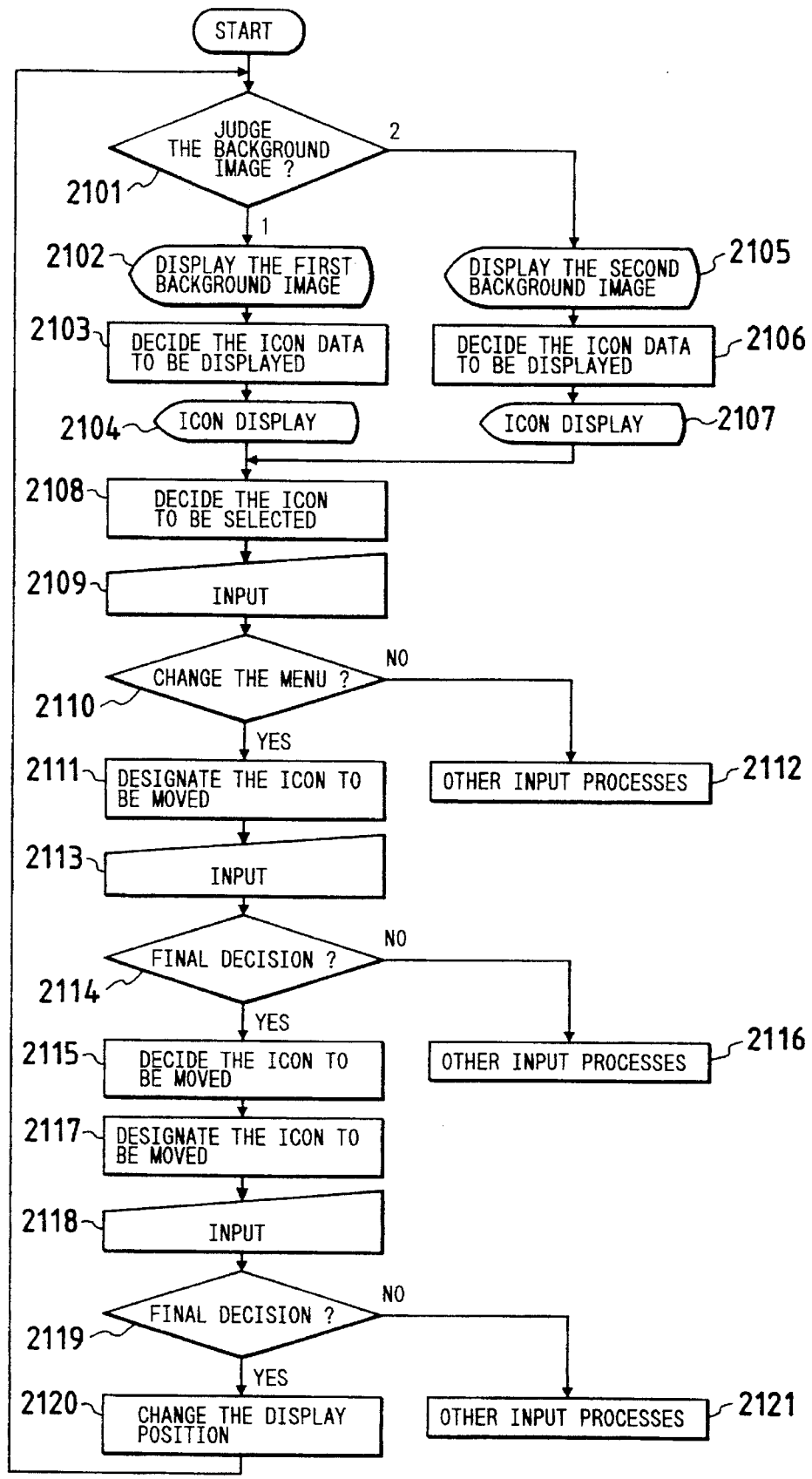
FIG. 21 is a flowchart indicating an operation of the third embodiment of the invention.

On the other hand, if the CPU determines, in step 2101 of FIG. 21, that the second background image 1902 of FIG. 19 is to be displayed, the CPU displays the second background image 1902 on the output unit 2012 in step 2105. Then, the CPU searches the display position data of the icon display information for an icon for which the background image 1902 is specified. Using the second display icon table 1904, the CPU determines that icon data specified by the table 1904 is to be used for display in step 2106. Namely, in the example of FIG. 19, icon data 1910-2 having a name specified by the second icon name data 1905 is determined as icon data to be displayed in step 2106 and the icon data is displayed at a display position specified by the data 1909 of FIG. 19 on the output unit 2012 in step 2107.

Thus, all icons to be displayed are displayed along with the specified background image. For example, if the first background image 1901 of FIG. 25(A), the perspective view of desk, is displayed on the screen, icons called a drawer, a new document, an update/print, a postcard creation, a dictionary, an address book, a study, a sample, and a label printing are displayed at respective positions numbered "00" through "08".

When the background and the icons have been displayed, the CPU determines, in step 2108, a selected icon and reversely displays the determined icon on the screen and displays a number of a position of the determined icon at a portion of the screen along with an operation guide, not shown. The processing is for guiding the user in the icon selection because the selection can be performed by both the cursor key portion 2423b and the numeric key portion 2423c. That is, when an up cursor key is pressed indicating a currently user-selected icon, the reverse display moves up; when a down cursor key is pressed, the reverse display moves down; when a right cursor key is pressed, the reverse display moves to the right; and when a left cursor key is pressed, the reverse display moves to the left. Also, the user is guided that the selection can be made by entering a number from the numeric key portion 2423c. It should be noted that the selected icon is predetermined. It is also possible to make an icon selected last the selected icon this time. The reverse display may also be performed not only on an icon but also on an icon number and/or icon name.

Then, the CPU accepts an input by the user from the input unit 2611 in step 2109. The CPU determines whether the input is for a menu change in step 2110. This determination is made by checking which key of the function key portion 2423d of FIG. 24 has been pressed. If the input is found to be an instruction for a menu change, the CPU changes guidance messages to tell the user that the system has entered source icon specification processing and perform the processing in step 2111. On the other hand, if the input is found to be other than the menu change instruction, the CPU performs processing accordingly in step 2112.

When the source icon processing has been performed in step 2111, the CPU receives an input by the user from the input unit 2011 in step 2113 and determines whether the input indicates "established" indicated by the Enter key 2423e in step 2114. If the input does not indicate "established," the CPU performs input processing accordingly in step 2116. If the input indicates "established," the CPU determines a source icon and displays a number of the source icon on the operation guidance in step 2115. In addition, it is possible to perform highlighted display such as reverse display or blinking display instead of or along with the operation guidance.

After the determination of the source icon, the CPU performs destination icon specification processing in step 2117. This processing is for indicating that the system has entered the destination icon specification processing by changing guidance messages. Following this processing, the CPU receives an input by the user from the input unit 2011 in step 2118 to determine whether the input indicates "established" in step 2119. If the input does not indicate "established," the CPU performs processing accordingly in step 2121. If the input indicates "established," the CPU exchanges the display position data of the source icon and the destination icon in step 2120.

That is, the display position data of the destination icon name is written to an item of the display position of the source icon and the display position data of the source icon name is written to an item of the display position of the destination icon. This effects exchanging of the icon display positions 1906 and 1909 if, for example, a first icon of FIG. 19 is specified as the source icon and a second icon as the destination icon. When the display positions have been exchanged, the menu is displayed again.

Consequently, according to the third embodiment of the invention, as shown in FIG. 25(A) for example, the menu change processing is performed as shown below if icons are respectively displayed at positions numbered "00" through "08" against the first background image 1901. First, the user specifies to change menus and specifies the new document icon "01" displayed against the first background image 1901 as the source icon. Then, the user selects the drawer icon. The view inside drawer shown in FIG. 25(B) is displayed on the screen. Now, if the user selects a blank numbered "09" displayed against the second background image 1902 as the destination icon (FIG. 25(B) shows the state effected after the movement, but it is assumed that "09" has been blank before the movement), the menu screen shown in FIG. 25(B) appears.

In FIG. 25(B) shows the menu screen in which icons are displayed respectively at positions "09" through "19" (in this case, the icons are displayed at positions "09" through "13") shown against the second background image 1902 expressing inside drawer. At the display position numbered "09" of the destination icon, a top view of the new document icon is displayed. On the other hand, in the icon menu having the background image 1901, a blank icon is displayed on the display position "01." Since only a transparent frame is defined for this blank icon as mentioned above, this icon is invisible and only a corresponding part of the background or the desk is shown. However, a number display portion and the name display portion of the blank icon are displayed at this position because these displays are necessary for specifying a destination when icons are exchanged.

It will be apparent that, in the present embodiment, a change may be made to the icon layout by exchanging display positions.

Thus, according to the third embodiment of the invention, the user can move icons from one background image to another, thereby providing an icon menu display most suitable to the user. Since the relationship of the icons with the background images is associative with a real-world desk work, operational efficiency is enhanced even for users who are unfamiliar with a formal menu screen.

Further, according to the third embodiment, minimally necessary functions are preset in the background image 1901 by the system, so that the embodied information processing apparatus is readily available for busy users and novice users. This embodiment also allows the user to construct a user-unique icon menu.

Now, a fourth embodiment of the present invention will be described. Referring to FIG. 22, there is shown a data structure of the fourth embodiment. As shown in the figure, the fourth embodiment has background image display position icon tables 2203 and 2204 corresponding to background images 2201 and 2202 respectively. The embodiment also has a plurality of pieces of icon display information. As in the case of the third embodiment of the present invention, each of the icon display information consists of an icon name, an icon display position, and a plurality of pieces of icon data.

The fourth embodiment differs from the third embodiment in that each background image is divided into a plural number of regions (to be specific, two regions), for each of which a form of icon data may be specified. This is realized by holding, in the background image display position icon tables 2203 and 2204, information necessary for specifying the icon data for each region. And, information for specifying a region is added to icon display information 2200 in addition to information for specifying a background image and display position coordinates. Further, icon data having a form suitable for each region is prepared. Prepared in the fourth embodiment are icon data for two regions for the background image 2201 and icon data for the background image 2202, a total of three types of icon data. Consequently, in the fourth embodiment, same icon data are specified for each of the regions in the background image display position icon table 2204.

Figure 26A:
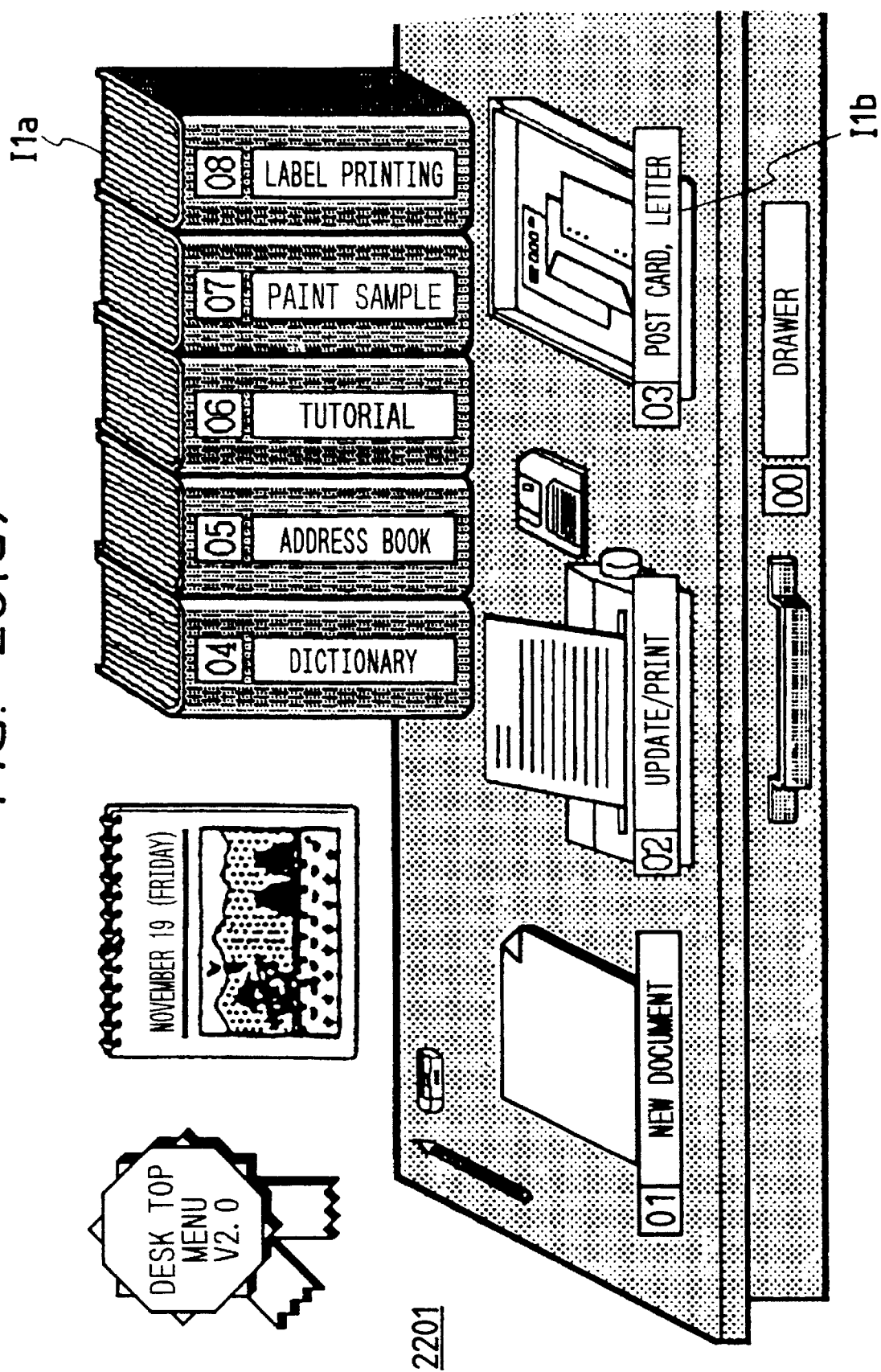
FIGS. 26(A) and 26(B) show examples of display screens of the fourth embodiment of the invention.
Figure 26B:
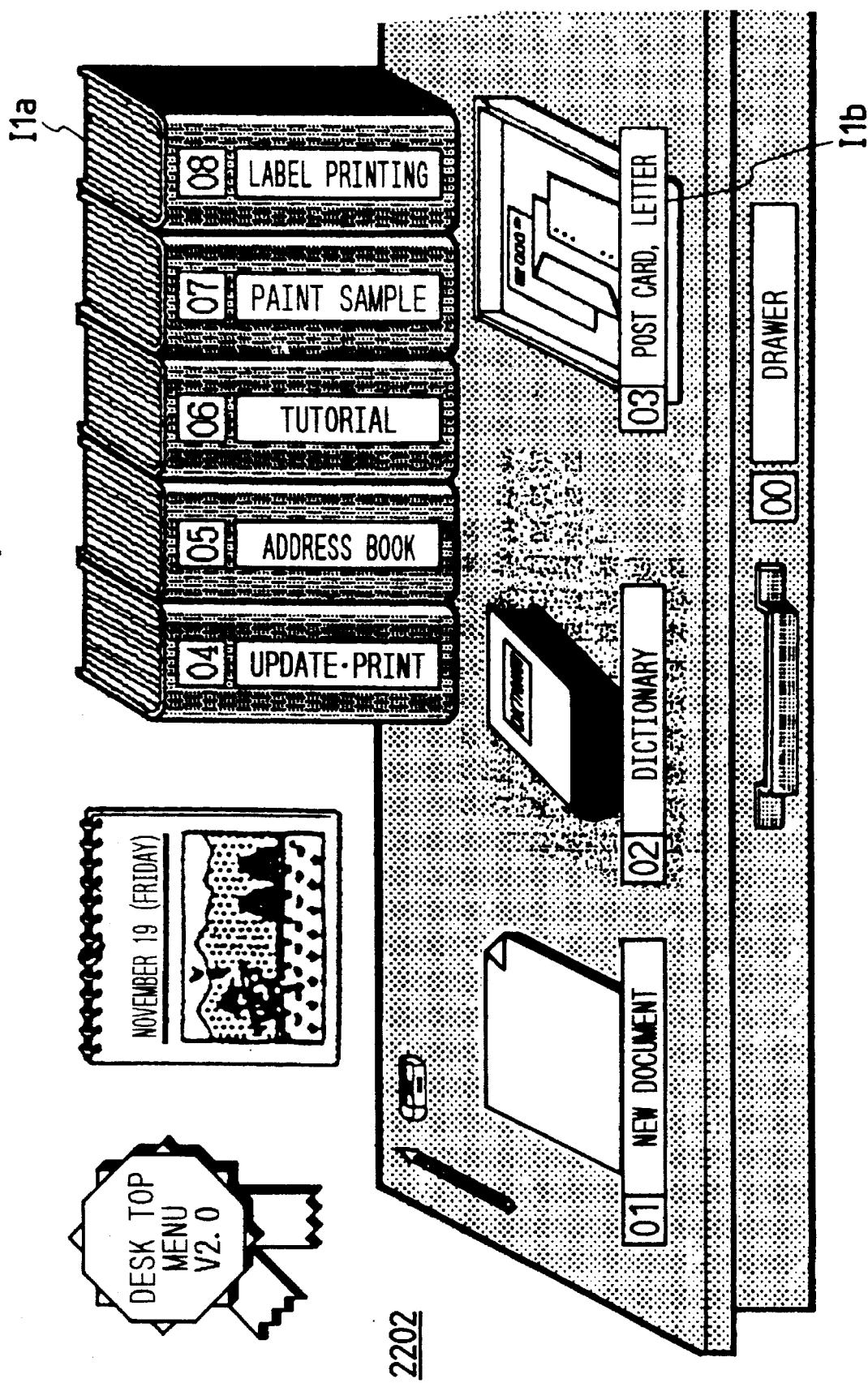

In the fourth embodiment, as shown in FIG. 26(A), a first background image is divided into a first region IIa in which standing icons are laid out and a second region IIb in which lying icons are laid out. As for a second background image, the icon presenting form does not change by region. As a result, the second background image is generally the same as the background image of FIG. 25(B).

To be specific, first icon display information consists of an icon name 2205, an icon display position 2206, and icon data 2207-1 through 2207-3 as shown in FIG. 22. Second icon display information consists of an icon name 2208, an icon display position 2209, and icon data 2210-1 through 2210-3.

The above-mentioned background image display position icon table 2203 has display position storage regions 2203-1 and 2203-2 that store information for specifying, from a plurality of types of icon data, icon data having forms to be used in these regions. For example, as shown in FIG. 22, 2207-2 corresponds to the area 2203-1 and 2210-3 corresponds to the area 2203-2.

Likewise, the background image display position icon table 2204 has display position storage regions 2204-1 and 2204-2 that store information for specifying, from a plurality of types of icon data, icon data having forms to be used in these regions. However, in the fourth embodiment, icons are displayed against the background image 2202, not classified by region but in a same form. Therefore, with the background image 2202, icon data are specified in the same form in each region.

Now, an operation of the fourth embodiment having the data structure of FIG. 22 will be described with reference to a flowchart of FIG. 23. It should be noted that the fourth embodiment is similar to the third embodiment in hardware configuration; namely, the fourth embodiment has the hardware configuration of FIG. 21.

Figure 23:
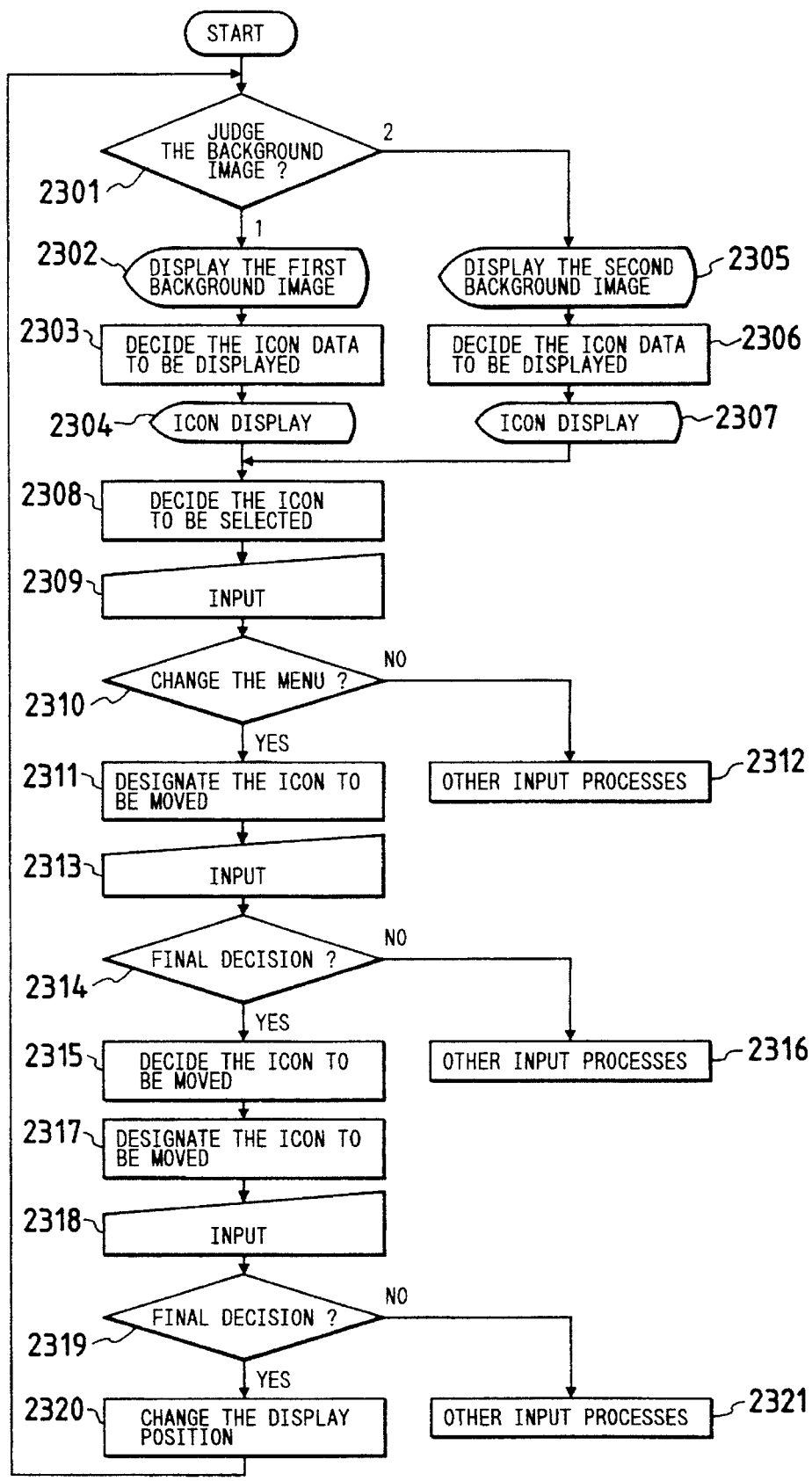
FIG. 23 is a flowchart indicating an operation of the fourth embodiment of the invention.

First, the CPU 2013 determines a background image to be displayed according to an input by the user from the input unit 2011 in step 2301 of FIG. 23. Upon determination that the first background image 2201 of FIG. 22 is to be displayed, the CPU displays the first background image on the output unit 2012 in step 2302. This operation is the same as that of the third embodiment.

Data necessary for icon display include an icon name, a display position, and icon data. The icon name and the display position are used without change because each of them is provided one for each icon as shown in FIG. 22. However, the icon data are provided in plurality for each icon; therefore, it is necessary to determine a piece of icon data to be used. To do so, if the background image 2201 is displayed on the screen of the output unit 2012, the first background image display position icon table 2203 stored in the internal storage unit 2014 for example is used to determine icon data to be used for icon display in each region in step 2303.

That is, the CPU 2013 searches the icon display information for display position data 2206 to check which of the first background image and the second background image an icon concerned belongs to and which of the regions of the belonging background image the icon concerned belongs to. If the icon belongs to the first background image and to a first region thereof for example, then the CPU checks information for specifying icon data stored in the region 2203 of the first background image display position icon data table 2203. Based on the checked information, the CPU determines, in step 2303 of FIG. 23, the icon data to be displayed. Then, according to the display position data, the CPU displays the icon on the background image at a specified position in step 2304 of FIG. 23.

Likewise, if display position data 2209 in the icon display information has information indicating that the icon belongs to a second region of the first background image, the CPU 2013 checks information for specifying icon data stored in the region 2203-2 of the background image display position icon data table 2203. Based on the checked information, the CPU determines, in step 2303 of FIG. 23, icon data to be displayed. Then, according to the display position data, the CPU displays the icon on the background image at a specified position in step 2304 of FIG. 23.

On the other hand, if the CPU determined that a background image to be displayed is the second background image 2202 in step 2301 of FIG. 23, then the CPU displays the second background image in step 2303. Then, as mentioned above, the CPU determines, in step 2306, icon data to be displayed and displays the determined icon in step 2307.

When the background image and the icon have been displayed, the CPU determines one selected icon, reversely displays the icon on the screen, and displays a number of the icon along with a guidance as in the third embodiment of the invention in step 2308.

Then, the CPU receives a user input coming from the input unit 2011 in step 2309. The CPU determines whether the input made by the user is for menu change in step 2310. This determination is made by checking a function defined in the user-operated function key portion 2423d on the input unit 2011. If the input is for menu change, the CPU changes guidance messages and performs source specification icon processing informing the user that the system has entered source icon specification processing in step 311. If the input is for other than menu change, the CPU performs processing accordingly in step 2312. It should be noted that key function key portion 2423d includes a key portion extendedly defined in software approach (this holds true with the third embodiment of the invention).

When the source specification icon processing has been done in step 2311, the CPU receives a user input coming from the input unit 2011 in step 2313 to determine whether the input indicates "established" or not in step 2314. If the input does not indicate "established," the CPU performs input processing accordingly. If the input is the "established," the CPU determines, in step 2315, a source icon to display its number on the guidance.

When the source icon has been determined, the CPU performs destination icon specification processing in step 2317. This processing indicates that the guidance message change has been made and the system has entered the destination icon specification processing. Then, the CPU receives a user input coming from the input unit 2011 in step 2318. The CPU determines whether the input indicates "established" in step 2319. If the input does not indicate "established," the CPU performs input processing accordingly in step 2321. If the input indicates "established," the CPU exchanges display position data of the source icon and an destination icon in step 2320. Thus, if a first icon has been specified as the source icon and a second icon as the destination icon in FIG. 22, the icon display positions 2206 and 2209 are exchanged. After the display position exchange, a menu is displayed again. In the displayed menu, the icon positioned in the region IIb has moved to the region IIa and is displayed in a standing manner. On the other hand, the icon positioned in the region IIa has moved to the region IIb and is displayed in a lying manner.

Thus, according to the fourth embodiment, each of the background image display position icon tables 2203 and 2204 has a plurality of regions storing a plurality of pieces of display position data of the icon display information, thereby displaying a plurality of icons against a background image at suitable positions according to the nature of the background image.

For example, referring to FIG. 26(A), a dictionary icon, an address book icon, a tutorial icon, a paint sample icon, and a label printing icon are displayed at positions "04" through "08" respectively as the icons IIa of the first region of the first background image 2201 representing a desk in a perspective view. Each of these icons has a shape of a binder standing on the desk. As the icons IIb of the second region, a new document icon, an update/print icon, and a postcard letter icon are displayed at positions "01" through "03" respectively. Each of these icons has a shape lying on the desk.

Now, it is supposed that the update/print icon in the region 2203-2 be selected as a source icon and the dictionary icon in the region 2203-2 as a destination icon. When this selection is made, the screen changes to a menu screen as shown in FIG. 25(B).

In the menu screen of FIG. 25(B), the dictionary icon or the destination icon is displayed at the position of the source icon indicated by "02" and the update/printing icon or the source icon is displayed at the position of the destination icon indicated by "04."

In this case, since icon data to be used are different according to the regions 2203-1 and 2203-2 of the background image display position icon table 2203, icon data corresponding to the regions included in the exchanged display positions are used. That is, for the source icon display position, icon data representing the dictionary icon in a perspectively lying form is used; for the destination icon display position, icon data representing the update/printing icon in a perspectively standing binder form.

It will be apparent that the fourth embodiment allows the user to exchange menus having different background images, as shown with the third embodiment. It is also possible to alter an icon layout against a same background image by exchanging display positions.

As with the third embodiment, the fourth embodiment allows the user to exchange a display position with a blank. This capability allows the user to leave only necessary icons against a desired background image, thereby enhancing operational efficiency and reducing the chance of making operational errors. This also holds true with the third embodiment.

As mentioned above, in the fourth embodiment, a same background image is divided into a plurality of regions, each of which may have a different form for representing icons. This novel setup allows the user to arrange relative frequently used icons at positions at which it is more convenient and less error-prone to handle such icons than other less frequently operated icons, thereby enhancing operational efficiency. The user can lay out the icons to his or her liking to realize an operational environment most suited to the user.

It will be apparent that the present invention is not limited to the above-mentioned embodiments. For example, in the data structures shown in FIGS. 19 and 22, the number of background images, display icon tables, background image display position icon tables, and pieces of icon data is not limited to two each. Also, the background images can be changed by means of the external storage unit. Further, the background images shown in FIGS. 25(A) and (B) can be simultaneously displayed in multiple windows.

Also, a copy capability can be added to display icon data having a same name against different background images. This allows the user to select copied icons in any background image.

According to the embodiments of the invention, a plurality of background images can be selected to construct a menu screen and icons can be displayed against each background image in a form suitable thereto.

According to the embodiments of the invention, an icon display position can be changed as required between different background images or inside a same background image. This allows the user to easily construct a menu screen to his or her liking, thereby enhancing operational efficiency.

Further, according to the embodiments of the invention, the menus can be changed easily regardless of the level of operator's skill. Also, the system provides menus having a system-standard form for the convenience of users having insufficient experience in handling icon menus.

While the preferred embodiments of the present invention have been described using specific terms, such description is for illustrative purposes only, and it is to be understood that changes and variations may be made without departing from the spirit or scope of the appended claims.

What is claimed is:

1. An icon menu display apparatus having icon selecting means for a user to select an icon from a plurality of icons displayed as an icon menu, comprising:

icon storage means for storing icon data defining an icon constituted at least by a plurality of portions of picture data and function name data, said icon being selectable by said icon selecting means;

background image storage means for storing a background image representing a perspective view of a room having a desk against which said icon menu is displayed;

background image display means for displaying said background image on an entire screen;

display position storage means for storing display position data representing a plurality of positions in said background image at which corresponding icons are placed according to function names thereof; and icon display means for displaying said icons on said background image at positions based on said display position data.

2. An icon menu display apparatus as defined in claim 1 wherein said icon corresponds to a word processor function such as creating and editing a document, a picture of said icon being a picture of forms paper, said icon being placed, according to said display position data, for display on a portion represented as a top of said desk represented as said background image.

3. An icon menu display apparatus as defined in claim 1 wherein said icon corresponds to a function such as updating and printing a document, a picture of said icon being a picture of a printer, said icon being placed, according to said display position data, for display on the portion represented as the top of said desk represented as said background image.

4. An icon menu display apparatus as defined in claim 1 wherein said icon corresponds to a postcard editing function for creating an address, a composition, and a picture to be printed on a postcard, a picture of said icon being a picture of said postcard, said icon being placed, according to said display position data, for display on a portion represented as the top of said desk represented as said background image.

5. An icon menu display apparatus as defined in claim 1 wherein said icon corresponds to a dictionary function such as a Japanese-language dictionary, an English-Japanese dictionary, and a Japanese-English dictionary, a picture of said icon being a picture of a book, said icon being placed, according to said display position data, for display on a portion represented as the top of said desk represented as said background image.

6. An icon menu display apparatus as defined in claim 1 wherein said icon corresponds to an address book function for creating and editing an address book, a picture of said icon being a picture of a book, said icon being placed, according to said display position data, for display on a portion represented as the top of said desk represented as said background image.

7. An icon menu display apparatus as defined in claim 1 wherein said background image to be stored in said background image storage means is a perspective view of a room having a desk and walls.

8. An icon menu display apparatus as defined in claim 7 wherein:

said icon storage means stores second icon data corresponding to each of a plurality of functions;

said background image storage means stores a second background image; and said display position storage means stores a second display position in which icons represented by said second icon data are arranged in a matrix of m rows and n columns, where m and n are integers; and said icon menu display apparatus further comprises menu mode setting means for a user to set at least one of a menu mode in which said icon menu is displayed and a menu mode in which a second icon menu arranged with the icons in the matrix is displayed wherein;

said background image display means displays, according to the menu mode set by the user, the background image stored in said background image storage means; and said icon display means displays, according to the menu mode set by the user, the icon stored in said icon storage means at the display position stored in said display position storage means.

9. An icon menu display apparatus as defined in claim 7 further comprising:

selected icon storage means for storing selected icon data indicating the icon selected by said icon selecting means; and icon cursor display means for displaying an icon cursor at the icon stored in said selected icon storage means.

10. An icon menu display apparatus as defined in claim 1 wherein:

said icon storage means stores second icon data corresponding to each of a plurality of functions;

said background image storage means stores a second background image; and said display position storage means stores a second display position in which icons represented by said second icon data are arranged in a matrix of m rows and n columns, where m and n are integers; and said icon menu display apparatus further comprises menu mode setting means for a user to set at least one of a menu mode in which said icon menu is displayed and a menu mode in which a second icon menu arranged with the icons in the matrix is displayed wherein;

said background image display means displays, according to the menu mode set by the user, the background image stored in said background image storage means; and said icon display means displays, according to the menu mode set by the user, the icon stored in said icon storage means at the display position stored in said display position storage means.

11. An icon menu display apparatus as defined in claim 1 further comprising:

selected icon storage means for storing selected icon data indicating the icon selected by said icon selecting means; and icon cursor display means for displaying an icon cursor at the icon stored in said selected icon storage means.

12. An icon menu display method for displaying on an entire screen, a plurality of icons, each corresponding to a respective one of a plurality of functions wherein a user selects a desired icon to activate a corresponding function, said icon menu display method displaying a perspective view of a room having a desk on the entire screen as a background for an icon menu and displaying said plurality of icons on a portion representing a top of said desk represented by said background image.

13. A method of operating an icon menu display apparatus having an icon menu containing a plurality of icons, said method comprising the steps of:

upon turning on power to said icon menu display apparatus, displaying a first icon menu comprising a background image representing a perspective view of a room containing a desk and a plurality of icons corresponding to a respective one of a plurality of functions;

selecting a desired icon from said plurality of icons with an icon cursor that is moved between said plurality of icons by means of an input unit provided on said first icon menu display apparatus;

executing a function corresponding to the selected icon;

terminating execution of said function; and upon termination of execution said function, displaying said icon cursor at a user-selected icon to display said first icon menu again.

14. A method of operating an icon menu display apparatus as defined in claim 11 further comprising the steps of:

setting to display at least one of said first icon menu and a second icon menu, in which a second icon corresponding to each function is displayed in matrix of m rows×n columns where m and n are integers;

wherein said first displaying step comprises displaying said icon cursor for selecting an icon on said at least one of said first icon menu and said second icon menu.

15. An icon menu display apparatus for displaying a menu screen containing a plurality of background images and a plurality of icons indicating individual functions to be selected, said icon menu display apparatus comprising:

first storage means for storing a plurality of types of background images;

second storage means for storing, for each of said plurality of icons, a plurality of functions display information including at least a plurality of types of icon data for specifying an icon form in which a selected icon is displayed;

third storage means for storing, for each of said plurality of types of background images stored in said first storage means, icon data specifying information for specifying which of the plurality of types of icon data stored in said second storage means is to be used for display;

input means for entering an instruction for said icon menu display apparatus;

determining means for determining which of said plurality of types of background images stored in said first storage means is to be used for display and determining icon data to be used for display in the determined background image by referencing said icon data specifying information stored in said third storage means; and display means for reading the determined background image and the determined icon data from said first storage means and said second storage means respectively for display on the menu screen.

16. An icon menu display apparatus as defined in claim 15 wherein said plurality of functions display information stored in said second storage means each further includes an icon name for identifying an icon and display position data for indicating a display position of the identified icon, said display position data having information for specifying the background image against which the icon is to be displayed and display coordinates of said background image.

17. An icon menu display apparatus as defined in claim 14 wherein said determining means, when a background image to be displayed has been determined, searches the display position data included in the icon display information stored in said second storage means to detect an icon having information for specifying the determined background image and, according to the icon data specifying information stored in said third storage means, the icon data to be used for display for the detected icon.

18. An icon menu display apparatus as defined in claim 16 wherein the icon data specifying information stored in said third storage means has information for specifying the icon data to be used for display for each of a plurality of regions obtained by dividing at least one background image, and the position display data of each piece of icon display information stored in said second storage means further has region specifying information indicating which of said plurality of regions defined in the background image the selected icon is to be displayed in.

19. An icon menu display apparatus as defined in claim 16 further comprising editing processing means for changing menu display states wherein;

said input means receives an instruction for the changing of menu display states;

said editing processing means executes at least changing of icon display positions as the change of menu display states and, when the icon display position change is instructed, exchanges the display position data of a source icon and the display position data of a destination icon; and said display means displays each of said icons based on the exchanged display position data.

20. An information processing apparatus capable of displaying a menu screen including a plurality of icons corresponding to functions to be selected and background images, said information processing apparatus comprising:

a central processing unit for performing arithmetic processing;

a storage unit for storing a program and data necessary for performing the arithmetic processing;

an input unit for receiving an instruction issued by an operator; and a display unit; wherein said storage unit stores a plurality of types of data for realizing said background images, icon display information including, for each icon, a plurality of types of icon data for specifying a form in which each icon is displayed, and icon data specifying information for specifying which of the plurality of types of icon data is to be used for display for each icon for each of the plurality of types of background images; and said central processing unit determins which of the background images stored in said storage unit is to be used for display, references the icon data specifying information stored in said storage unit to determine icon data to be used for display in the determined background image, and reads the determined background image and icon data from said storage unit and sends the read background image and icon data to said display unit for display.

21. An icon menu display method for a menu screen including a plurality of icons corresponding to functions to be selected and background images, comprising the steps of:

storing data necessary for displaying each of a plurality of types of background images and a plurality of icons, the data providing icon display information at least including a plurality types of icon data for specifying a form of an icon for display, and icon data specifying information for specifying which type of the icon data is to be used for display;

determining, when displaying a menu, which of the background images stored beforehand is to be used for display;

referencing the icon data specifying information stored beforehand to determine the icon data to be used for display in the determined background image; and displaying the determined background image and icon data on a display screen.

22. A menu picture display apparatus, comprising:

means for generating a plurality of icons each having a visual pattern representing a feature of a function associated therewith;

means for displaying a background image including a plurality of specific images each related to said function;

means for displaying an icon menu comprising said plurality of icons each displayed on said background image at a position related to said function;

means for selecting an icon in said icon menu; and means for executing the function of the selected icon.

23. A menu picture display apparatus, comprising:

means for generating a visual image representing a feature of a function to be executed in a work place;

means for displaying a background image of said work place including a plurality of specific images each related to said function;

means for displaying an icon menu comprising said plurality of icons each displayed on said background image at a position related to said function;

means for selecting an icon in said icon menu; and means for executing the function of the selected icon.

24. In a display apparatus having a processor, a display device memory and an input device, a menu picture display method, comprising the steps of:

generating in said memory, a plurality of icons each having a pattern representing a feature of a function to be executed;

said displaying device displaying a background image including a plurality of specific images each related to said function;

displaying an icon menu comprising said plurality of icons each embedded on said background image at a position related to said function;

selecting an icon in said menu by means of said input device; and executing the function of the selected icon.

25. In a display apparatus having a processor, a display device, memory and an input device, a menu picture display method comprising the steps of:

generating in said memory, a plurality of icons each having a pattern representing a feature of a function to be executed in a work place;

displaying by said display device, a background image of said work place, including a plurality of specific images each related to said function;

displaying an icon menu comprising said plurality of icons each embedded on said background image at a position related to said function;

selecting by said input device, an icon in said menu; and executing the function of the selected icon.

26. A menu display apparatus comprising:

means for generating a plurality of icons, each having a visual content depicting a function associated therewith;

means for displaying a background image comprising a plurality of areas defined by subimages, each of said subimages having a visual content which is functionally related to functions associated with at least one of said icons;

means for displaying each of said icons on said background image, in an area defined by a subimage having a visual content functionally related to a function of said icon;

means for selecting an icon from among said icons displayed on said background image; and means for executing the function associated with said selected icon.

27. Menu display apparatus according to claim 26 wherein said background image comprises a view of a work place and said subimages depict functional elements of said work place.

28. Method of operating a data processor comprising the steps of:

generating a plurality of icons, each having a visual content depicting a function associated therewith;

displaying a background image comprising a plurality of areas defined by subimages, each of said subimages having a visual content which is functionally related to functions associated with at least one of said icons;

displaying each of said icons on said background image, in an area defined by a subimage having a visual content functionally related to a function of said icon;

selecting an icon from among said icons displayed on said background image; and executing the function associated with said selected icon.

* * * * *